US011442974B2

(12) United States Patent
Ramchune et al.

(10) Patent No.: US 11,442,974 B2
(45) Date of Patent: Sep. 13, 2022

(54) AGGREGATION AND PRESENTATION OF INFORMATION FOR WELL ANALYSIS

(71) Applicant: Chevron U.S.A. Inc., San Ramon, CA (US)

(72) Inventors: Devanand Ramchune, Humble, TX (US); Ievgenii Froimson, The Woodlands, TX (US); Shana Bolen, The Woodlands, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 17/085,442

(22) Filed: Oct. 30, 2020

(65) Prior Publication Data

US 2021/0133387 A1 May 6, 2021

Related U.S. Application Data

(63) Continuation of application No. 62/929,263, filed on Nov. 1, 2019.

(51) Int. Cl.
| | |
|---|---|
| *G06F 16/34* | (2019.01) |
| *G06F 3/0481* | (2022.01) |
| *G06F 16/26* | (2019.01) |
| *G06F 40/103* | (2020.01) |

(52) U.S. Cl.
CPC ............ *G06F 16/34* (2019.01); *G06F 3/0481* (2013.01); *G06F 16/26* (2019.01); *G06F 40/103* (2020.01)

(58) Field of Classification Search
None
See application file for complete search history.

(56) References Cited

U.S. PATENT DOCUMENTS

| | | | | |
|---|---|---|---|---|
| 9,652,534 | B1 * | 5/2017 | Narayanan | G06F 16/7328 |
| 2004/0015485 | A1 * | 1/2004 | Salerno | G06F 16/954 |
| 2007/0156377 | A1 * | 7/2007 | Gurpinar | G01V 11/00 |
| | | | | 703/10 |
| 2010/0114493 | A1 * | 5/2010 | Vestal | E21B 41/00 |
| | | | | 702/9 |
| 2014/0157172 | A1 * | 6/2014 | Peery | G06Q 50/02 |
| | | | | 715/771 |

* cited by examiner

*Primary Examiner* — Mandrita Brahmachari
(74) *Attorney, Agent, or Firm* — Esplin & Associates, PC

(57) ABSTRACT

Responsive to a selection of a well (e.g., offset well), information coupled to the well may be obtained. Information coupled to the well may include structured information and unstructured information. A merged view of the obtained information may be presented. The merged view may provide a view of the structured information and the unstructured information organized according to a predefined presentation format and may facilitate analysis of the well (e.g., analysis of the offset well in planning a new well).

16 Claims, 22 Drawing Sheets

O' Drive Search Phrase Details

940

| Search Label | Search Phrase |
|---|---|
| Bit Run reports | Bit Run report |
| Bit Run summaries | Bit Run summary |
| Cas Bas | casbas |
| Cost estimates | "cost estimate" |
| Directional Survey | Directional Survey |
| Drilling Data Log | Drilling Data Log |
| EOWR | "end of well report" "EOW" |
| Geodetic Reports | Geodetic Report |
| Mud property reports | Mud property report |
| Mudlogs | Mudlogs |
| Offset Drilling Parameters | Offset Drilling Parameters |
| UCS Reports | UCS Report |

AGGREGATION AND PRESENTATION OF INFORMATION FOR WELL ANALYSIS

CROSS-REFERENCE TO RELATED APPLICATIONS

The present application claims the benefit of U.S. Provisional Application NO. 62/929,263, entitled "AGGREGATION AND PRESENTATION OF INFORMATION FOR WELL ANALYSIS," which was filed on Nov. 1, 2019, the entirety of which is hereby incorporated herein by reference.

FIELD

The present disclosure relates generally to the field of aggregating and presenting structured information and unstructured information for well analysis.

BACKGROUND

Before a well can be analyzed, relevant information from different data sources must be found and aggregated. Manually searching for and aggregating relevant information, as well as sorting through aggregated information, is difficult, time consuming, and prone to error.

SUMMARY

This disclosure relates to aggregating and presenting information for well analysis. A selection of a well may be obtained. Coupled well information may be obtained based on the selection of the well and/or other information. The coupled well information may include information coupled to the well. The coupled well information may include coupled structured information and coupled unstructured information. The coupled structured information may include one or more portions of the coupled well information organized according to one or more known predefined structures. The coupled unstructured information may include one or more portions of the coupled well information not organized according to any known predefined structure. Presentation of a merged view of the coupled well information may be effectuated. The merged view may provide a view of the coupled structured information and the coupled unstructured information organized according to a predefined presentation format and/or other information. The merged view may facilitate analysis of the well.

A system that aggregates and presents information for well analysis may include one or more electronic storage, one or more processors and/or other components. The electronic storage may store information relating to wells, information relating to selection of well, coupled well information, information coupled to wells, coupled structured information, coupled unstructured information, information relating to known predefined structures, information relating to merged views of the coupled well information, information relating to predefined presentation format for the merged view, and/or other information.

The processor(s) may be configured by machine-readable instructions. Executing the machine-readable instructions may cause the processor(s) to facilitate aggregating and presenting information for well analysis. The machine-readable instructions may include one or more computer program components. The computer program components may include one or more of a selection component, a well information component, a merged view component, and/or other computer program components.

The selection component may be configured to obtain a selection of one or more wells. The selection of the one or more wells may be obtained based on one or more user input and/or other information.

The well information component may be configured to obtain coupled well information based on the selection of the well(s) and/or other information. The coupled well information may include information coupled to the well. The coupled well information may include coupled structured information and coupled unstructured information. The coupled structured information may include a portion of the coupled well information organized according to a known predefined structure. The coupled unstructured information may include a portion of the coupled well information not organized according to any known predefined structure.

In some implementations, the coupled structured information may be coupled to the well based on the known predefined structure of the coupled structured information.

In some implementations, the coupling between the structured information and the well may include a ranked coupling. The ranked coupling may include a higher ranked coupling between the well and first coupled structured information and a lower ranked coupling between the well and second coupled structured information. The coupled structured information may be obtained further based on the ranked coupling such that: a search for the coupled structured information within one or more data sources includes a search for the first coupled structured information before a search for the second coupled structured information; responsive to the first coupled structured information being found within the one or more data sources, the first coupled structured information is obtained and the search for the second coupled structured information is not performed; and responsive to the first coupled structured information not being found within the one or more data sources, the search for the second coupled structured information is performed.

In some implementations, the coupled unstructured information may be coupled to the well based on user coupling of the coupled unstructured information to the well. In some implementations, the user coupling of the coupled unstructured information to the well may be facilitated by a computer-aided search of unstructured information within one or more data sources.

In some implementations, the computer-aided search of the unstructured information within the one or more data sources may include a search of one or more characters extracted from an unstructured file. In some implementations, the unstructured file may include a document file, a presentation file, a message file, an image file, a video file, or an audio file.

In some implementations, the computer-aided search of the unstructured information within the one or more data sources may include a search of the unstructured information for a feature, a property, or a log of the well. In some implementations, an unstructured file may include one or more text or one or more visual representations of the feature. The property or the log of the well may be found responsive to the search of the unstructured information for the feature, the property or the log of the well. Portions of the unstructured file including the one or more text or the one or more visual representations of the feature, the property or the log of the well may be presented to facilitate user coupling of the unstructured file to the well. In some implementations, a link may be presented to enable user retrieval of the unstructured file.

The merged view component may be configured to effectuate presentation of one or more merged views of the coupled well information and/or other information. The merged view(s) may provide view(s) of the coupled structured information and the coupled unstructured information organized according to a predefined presentation format. The merged view(s) may facilitate analysis of the well.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 3, 4A, 4B, 5, 6, 7A, 7B, 8, 9A, 9B, 9C, 9D, 10A, 10B, 10C, 11, 12A, 12B, 12C, 12D, and 12E illustrate example user interfaces for aggregating and presenting information for well analysis.

DETAILED DESCRIPTION

The present disclosure relates to aggregating and presenting information for well analysis. Responsive to a selection of a well (e.g., offset well), information coupled to the well may be obtained. Information coupled to the well may include structured information and unstructured information. A merged view of the obtained information may be presented. The merged view may provide a view of the structured information and the unstructured information organized according to a predefined presentation format and may facilitate analysis of the well (e.g., analysis of the offset well in planning a new well).

Figure 1:
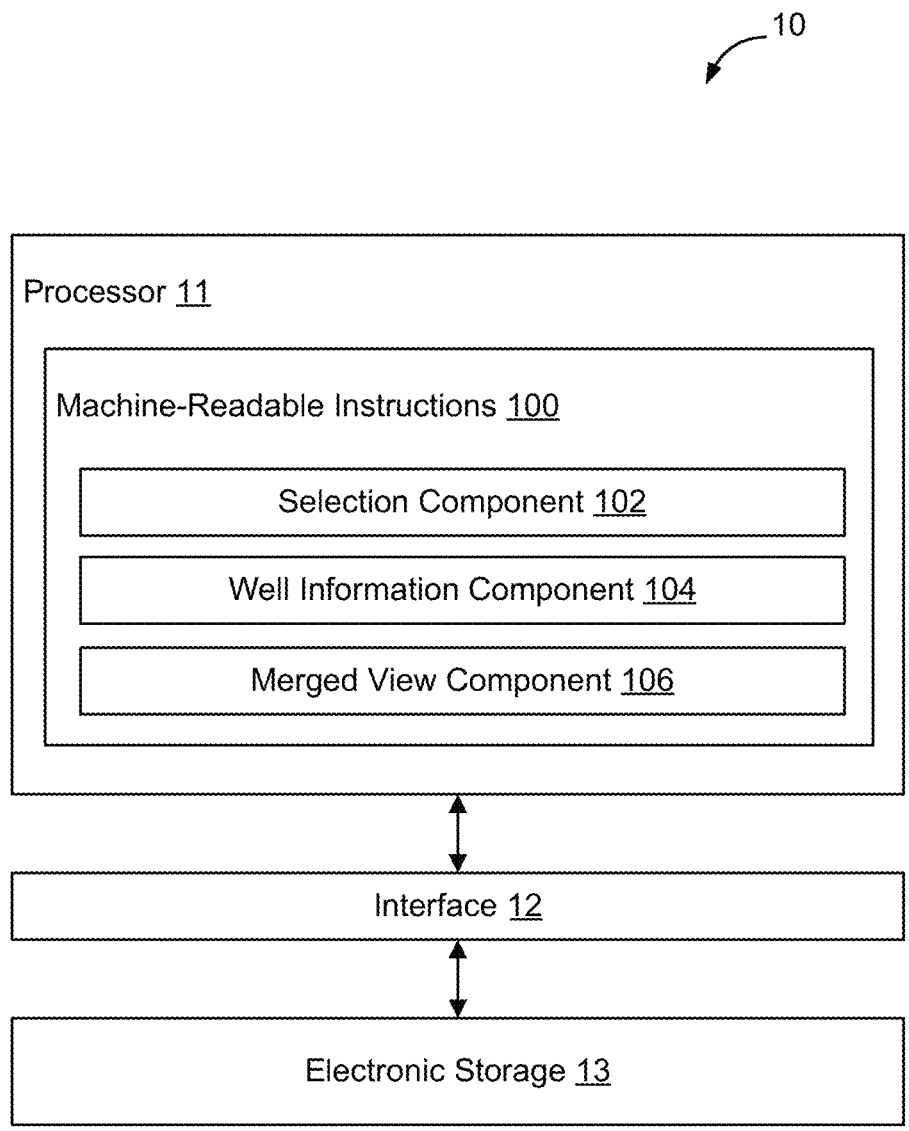
FIG. 1 illustrates an example system that aggregates and presents information for well analysis.

The methods and systems of the present disclosure may be implemented by a computing system and/or in a computing system, such as a system 10 shown in FIG. 1. One or more features and/or functionalities of the present disclosure may be implemented through and/or facilitated by one or more interfaces (e.g., user interface, application programming interface), such as the example user interfaces shown in FIGS. 3, 4A, 4B, 5, 6, 7A, 7B, 8, 9A, 9B, 9C, 9D, 10A, 10B, 10C, 11, 12A, 12B, 12C, 12D, and 12E.

The system 10 may include one or more of a processor 11, an interface 12 (e.g., bus, wireless interface), an electronic storage 13, and/or other components. A selection of a well may be obtained by the processor 11. Coupled well information may be obtained by the processor 11 based on the selection of the well and/or other information. The coupled well information may include information coupled to the well. The coupled well information may include coupled structured information and coupled unstructured information. The coupled structured information may include one or more portions of the coupled well information organized according to one or more known predefined structures. The coupled unstructured information may include one or more portions of the coupled well information not organized according to any known predefined structure. Presentation of a merged view of the coupled well information may be effectuated by the processor 11. The merged view may provide a view of the coupled structured information and the coupled unstructured information organized according to a predefined presentation format and/or other information. The merged view may facilitate analysis of the well.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to wells, information relating to selection of well, coupled well information, information coupled to wells, coupled structured information, coupled unstructured information, information relating to known predefined structures, information relating to merged views of the coupled well information, information relating to predefined presentation format for the merged view, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate aggregating and presenting information for well analysis. The machine-readable instructions 100 may include one or more computer program components. The machine-readable instructions 100 may include one or more of a selection component 102, a well information component 104, a merged view component 106, and/or other computer program components.

It may be necessary to analyze variety of information relating to a single well or multiple wells. For example, to plan for upcoming wells, it may be necessary to analyze information relating to offset wells to identify potential problems that may be encountered through drilling of the upcoming wells and mitigate those problems for the upcoming wells. Extensive amount of time may be required to gather and analyze the relevant information. For instance, extensive amount of time may be required to perform data discovery, data loading, and quality assurance/quality control of offset well data for drilling and completion and/or geological and geophysical data. Extensive amount of time may be required to find relevant collection of information (e.g., files), such as end of well reports, bottom hole assembly (BHA) reports, photos of drilling tools, root cause analysis, and/or other information. Extensive amount of time may be required to edit the information, identify corresponding data from different files/sections of information, and to develop visuals for the analysis. Such manual process of gathering and analyzing information relating to wells may not only take a very long time to accomplish, it may be subjective and prone to error. For instance, different persons may gather different types of information. Error may be made when attempting to pull relevant data. For instance, mistakes in terms of which wells, drilling tools, and/or parameters are used to gather information may result in faulty comparison of wells and/or drilling performance.

To facilitate well analysis, both structured information (e.g., WellView data, WITSML data, Geology data) and unstructured information (e.g., reports in multiple formats, pictures, presentations, logs) for wells (e.g., offset wells, planned wells) are aggregated. Single or multiple data sources (e.g., databases, file locations, shared drive) may be searched and/or scanned to obtain information relating to wells. Different information/portions of information may be coupled (e.g., connected, linked, related) to the wells and/or to other information/other portions of information based on user interaction (e.g., user annotation, chain of user decisions), and the coupling between different information/portions of information may be used to surface relevant information to the users. Analysis may be performed on the aggregated data to provide accurate and standardized view of the information, such as multiple well performance, run parameter comparisons, trajectory comparison, and/or formation top plots.

In some implementations, one or more logic disclosure herein may be built within one or more application programming interfaces. The application programming interface(s) may provide one or more standardized interface through which different systems (e.g., software and/or hardware) may leverage to obtain information and/or views of information (e.g., obtain aggregated information into the system, obtain merged views of the aggregated information).

The selection component 102 may be configured to obtain a selection of one or more wells. A well may refer to a hole or a tunnel in the ground. A well may be drilled in the ground for exploration and/or recovery of natural resources in the ground. For example, a well may be drilled in the ground to aid in extraction of petrochemical fluid (e.g., oil, gas, petroleum, fossil fuel). As another example, the well may be drilled in the ground for fluid injection. A well may expose and/or run through different types of materials (e.g., sedimentary rocks) in the ground. A well may refer to a well that has been drilled (e.g., offset well used as a guide for planning a well), a well that is being drilled, or a well that is planned to be drilled (e.g., planned well).

The selection of the well(s) may be obtained based on one or more user input and/or other information. User input may be received through one or more user interfaces and/or other information. For example, a user may interact with a user interface to enter the name of the well and/or select a well from a listing of wells to make a selection of the well.

As another example, a user may interact with a user interface to select a project including one or more wells, and the user selection of the project may result in selection of the well(s) within the project. The project may include one or more wells. For example, a projection may include one or more planned wells and one or more offset wells, and user selection of the project may effectuate selection of the planned well(s) and the offset well(s) within the projection. As another example, the selection of the well may include selection of one of the wells within the project. As yet another example, the selection of the well may include addition of the well to a project. For instance, the user may create a new project or open an existing project, and user selection of a well may include user interacting with a user interface to add a well to the project.

In some implementations, user selection of a well may be facilitated through one or more searches. For example, user may begin the well selection process by typing one or more features of the well (e.g., name of the well, characteristic of the well). The typed feature(s) of the well may be searched among list of wells to find the well that matches the typed feature(s) (e.g., find wells with matching name, matching characteristics). The user may be able to select from the listed wells to make the selection of the well. In some implementations, the searching may be restricted by locations, times, and/or other factors. For example, searching for the typed feature(s) may be restricted to wells within a certain geographical area. As another example, searching for the typed feature(s) may be restricted to wells drilled within a certain time period. Other restrictions on searching are contemplated.

The well information component 104 may be configured to obtain coupled well information based on the selection of the well(s) and/or other information. Obtaining coupled well information may include one or more of accessing, acquiring, analyzing, determining, examining, identifying, loading, locating, opening, receiving, retrieving, reviewing, selecting, storing, utilizing, and/or otherwise obtaining the coupled well information. The well information component 102 may obtain coupled well information from one or more locations. For example, the well information component 102 may obtain coupled well information from a storage location, such as the electronic storage 13, electronic storage of a device accessible via a network, and/or other locations. The well information component 102 may obtain coupled well information from one or more hardware components (e.g., a computing device, a component of a computing device) and/or one or more software components (e.g., software running on a computing device). The well information component 102 may obtain coupled well information from one or more data sources. Coupled well information may be stored within a single file or multiple files.

In some implementations, obtaining information may include searching for the information from one or more data sources. For example, the well information component 104 may be configured to obtain coupled well information by performing one or more searches (e.g., individual searches, combination searches, multi-layered searches) in one or more data sources. In some implementations, one or more locations of the data source(s) that are searched may be determined based on user selection. For example, information may be stored in a hard/shared drive and the well information 104 may obtain the information by performing searches in the hard/shared drive and/or within one or more particular folders of the hard/shared drive. For instance, responsive to user selection of a well, a user interface may present a list of hard drives/shared drives, and/or folders (e.g., top folders, sub-folders) that may be included within the search(es) to obtain the information. The location(s) that will be searched may be set/assigned based on user selection among the listed locations. In some implementations, a strict correspondence may be maintained between locations of searches and different wells. For example, based on a folder being selected as including information relevant to a well (and therefore will be targeted for searching to obtain well information), the user may be prohibited from selecting the same folder as including information relevant to another well. In some implementations, the user interface may provide one or more messages that the location (e.g., drive, holder) should only be assigned to a particular well. In some implementations, locations that have been assigned to wells may be filtered out from appearing within the list from which a user may select search location.

Well information may refer to information relating to a well. Well information may characterize one or more features (e.g., attribute, characteristic, property) of the well and/or one or more features of drilling tool(s) used/being used/to be used with the well. A drilling tool may refer to a device or an implement designed and/or used for drilling. A drilling tool may be designed and/or used to drill one or more substances. For example, a drilling tool may include a rock drilling tool for drilling into and/or through rock (e.g., sedimentary rock). A drilling tool to may refer to one or more portions of a device/implement that performs the drilling. A drilling tool may refer to portions of or entirety of a device/implement that performs drilling. For example, a drilling tool may refer to one or more portions of a drilling rig, such as a drill string, one or more portions of the drill string (e.g., bottom home assembly, transition pipe, drill pipe), and/or other portion(s) of the drilling rig. Other drilling tools are contemplated.

Well information may be generated/determined prior to drilling of the well, during drilling of the well, and/or after drilling of the well. For example, well information may include planning information relating to (e.g., describing) how the well is to be drilled, drilling information relating to (e.g., characterizing, reflecting) operation parameters of the drilling tool during drilling, conditions of the well detected by one or more sensors during drilling, and/or events that occurred during drilling, post-drilling information relating to research, analysis, and/or conclusions made after the drilling, and/or other well information.

Coupled well information may refer to well information that has been coupled to a well. Information that has been coupled to a well may refer to information that has been coupled to the well itself, coupled to one or more features of the well, coupled to one or more drilling tools used with the well, coupled to one or more features of the drilling tools, coupled to other information relating to the well, and/or otherwise coupled to the well. Coupling of information may refer to connecting, correlating, linking, or relating of the information. For example, coupling of information to a well may include connecting, correlating, linking, or relating the information to the well. For example, coupled well information may include information that has been connected to a well or for well analysis, and/or information that has been determined to be relevant to a well or for well analysis. As another example, coupling one piece of information to another piece of information may include connecting, correlating linking, or relating the one piece of information to the other piece of information. For instance, specific pieces of information may be correlated to each other, with the correlations forming one or more chains. For example, images of bits may be connected to a specific bit run, and the bit run may be connected to a well (e.g., as being one of the bit runs within the well). Coupling between information (e.g., coupling between different data) may enable relevant information to be surfaced to users for analysis. Coupling between information may be used to ensure that correct well information (e.g., information relating to particular well, no mix-up of well) is presented to users. In some implementations, obtaining coupled well information may include determining coupling of well information. Some or all of the information obtained by the well information component 104 may be presented to a user for the user to determine the coupling of the information. For example, a user may couple an image of a bit to a particular bit by tagging the image as a picture of the particular bit.

The coupled well information may include coupled structured information and coupled unstructured information. The coupled structured information may include one or more portions of the coupled well information organized according to one or more known predefined structure. A known predefined structure may refer to a known predefined schema by which the information is organized. Information organized according to a known predefined structure may include the information being stored such that the location of storage indicates the relevance and/or the identity of the stored information. The predefined structure may enable specific information to be found based on the location of the information (e.g., where a piece of information is stored within a file, where a piece of information is located within a table). For example, information organized according to a known predefined structure may include information stored in one or more databases (e.g., relational database(s), table(s), workbook(s), spreadsheet(s)), with the specific locations within the database corresponding to specific relevant/identity of the stored information. As another example, information organized according to a known predefined structure may include information stored in a known format, with the formatting defining/specifying where certain/specific information are stored.

The coupled unstructured information may include one or more portions of the coupled well information not organized according to any known predefined structure. Unstructured information may include information that is not organized according to any predefined structure and/or information that is organized according to an unknown predefined structure. Unstructured information may have structure (e.g., format), but the structuring may not be known or may not follow a known predefined schema. For example, information not organized according to any known predefined structure may include information inside a document (e.g., word document, electronic message, presentation, image, video, audio).

In some implementations, determining the structure of unstructured information may enable specific information to be found based on the location of the information. For example, logs generated during drilling (e.g., mud log, drilling data log) may be stored on a hard/share drive without following any predefined structure. The location of the logs on the hard/share drive may not specify that the files are logs or specify the type of the logs. Additionally, same types of files may be stored using different names, using different naming conventions, and/or without use of any naming convention. Determining that the files include logs of specific type may enable automatic analysis of the information within the files based on the structure by which the logs are generated. That is, determining that a file is a specific type of a log may enable automatic analysis of information within the log based on where the information is stored within the log.

In some implementations, coupling of information may be performed based on the known predefined structure of the information and/or other information. For example, the coupled structured information may be coupled to the well based on the known predefined structure of the coupled structured information and/or other information. Knowledge on processes used to generate/determine coupled structured information may be used to determine coupling of the structured information. Different portions of the well information may be coupled to the well (e.g., coupled to the well itself, coupled to one or more features of the well, coupled to one or more drilling tools used with the well, coupled to one or more features of the drilling tools, coupled to other information relating to the well) based on the known schema and/or the format of the information. For example, knowledge on processes used to generate/determine coupled structured information may be used to determine which pieces of the structured information will be coupled to well, well feature, drilling tool, drilling tool feature, and/or other pieces of structured information. As another example, the structure of unstructured information may be determined based on user input (e.g., user designating a file as being a log of a particular type), and the unstructured information may be coupled to the well based on the now-known structure of the unstructured information. In some implementations, one or more rules and/or logic may be used to determine coupling of information based on the predefined structure of the information.

For example, information on BHA runs may be organized by timestamps and/or other factors. The depth of BHAs may be used to aggregate and analyze the information. For instance, all runs with zero depth progress or without depth indicated may be removed/filtered out as not relevant to drilling activities. In some implementations, information relating to formations within a single bit/BHA run may be selected/analyzed based on whether or not the bit (BHA) went through a formation. The bit (BHA) may be determined to have went through a formation based on occurrence of following conditions: (1) actual formation top (e.g., identified during drilling)≤BHA depth out; and (2) actual formation bottom (e.g., identified during drilling)≥BHA depth in. The bit may travel through only a part of top and bottom formations. The actual travel distance may be identified as a difference between formations tops and bottoms and in and out depths of this BHA.

In some implementations, refined section performances may be selected based identifying/retrieving information for BHA's that meet one or more conditions. For example, when selection a well section, BHA's that have met one of the below conditions may be identified: (1) BHA depth in ≥section top and BHA depth in <section bottom; (2) BHA depth out >section top and BHA depth out ≤section bottom; (3) BHA depth in ≤section top and BHA depth out ≥section bottom.

Using the obtained list of BHA's, a list of section performances associated to the Bit (BHA) may be obtained. Then, the list of formations may be adjusted by using formation tops and bottoms and section tops and bottoms to only those specific to that section.

For real-time historical (e.g., WITSML) data aggregation, key depths for a well may be put together as a single distinct list. Those may include: Bit/BHA in and out depths, formation tops and bottoms, section tops and bottoms, and/or other things. Dates may be controlled as side-track activities may have the same depths on the same well. Time stamp may be used to select proper bulk portion of the information. However, depths limits may be used for the actual calculations. The data may then be broken down into those ranges. Individual depth range may then be applied against the set of data, identified on the previous step. The raw data within that range may be averaged and/or otherwise aggregated (e.g., min, max, mean, median calculation). The result of averaging/aggregating multiple parameters may then be stored and made available to users. The selection of the correct performance indicators may then be performed by depths ranges of a formation, specific to a Bit (BHA) run of interest.

In some implementation, one or more algorithms may be used to compile lists of formations from multiple lists. For example, the following formations-layers algorithm may be used to compile a single list of formations from multiple lists of those for individual wells and assign proper tops, thicknesses/presences and transitions. This information may be used to present wells that are subject to the analysis in a merged view (e.g., on the same canvas) and show the layout of formations between the wells. The algorithm may include the following: (A) obtain formations data for each individual well in the analysis set; (B) remove formations with missing depths or zero thicknesses; (C) arrange formations within individual well by formation top depths from lowest to highest; (D) out of the wells, select formation with the lowest depth value. Wells having no formations in the list are omitted for this step. This formation becomes the currently processed formation. Further identification may be performed by name; (E) individual well may be tested if its top formation matches to the formation, identified at the previous step. If it is, the formation is moved to the output list for that well with the listed depth. This formation is then removed from the source list, which makes the following formation on that well to become the top formation of that well and reduces the source list of formations; (F) if the formation is not listed on the well as its top formation, that formation is being added to the output list of formations for that well with unspecified formation top depth value; (G) all the wells are tested to determine whether there is at least one well present with a formation in the source list. If at least one well is present, the processing repeats from step 'D'; (H) if there's no more formations left in all the wells, the process proceeds to the next phase; (I) for individual well, the formation with the lowest formation top depth value is identified. All the formations on the list of that well that are preceding to the formation with the lowest depth value and/or having formation top value not specified, gets updated with that value, which makes the formations have zero thickness; (J) individual formation in individual well is tested in sequence. If one of the formations has formation top depth not specified, the value is derived from the preceding formation, which makes the formation have zero thickness; (K) for individual well, the formation with the highest formation bottom depth value is identified. All the formations on the list of that well that are succeeding to the formation with the highest depth value and/or having formation top value not specified gets updated with that value, which makes the formation have zero thickness. Other algorithms are contemplated.

In some implementations, the coupling between the structured information and the well may include a ranked coupling. Ranked coupling may be used to prioritize obtaining/using information with higher ranked coupling. Ranked coupling may put in order a piece of information that may be used (e.g., preferably used) before other pieces of information. For example, the ranked coupling may include a higher ranked coupling between the well and one piece of coupled structured information (e.g., information from one source) and a lower ranked coupling between the well and another piece of coupled structured information (e.g., information from another source). The coupled structured information may be obtained further based on the ranked coupling such that a search for the coupled structured information within one or more data sources includes a search for the first coupled structured information before a search for the second coupled structured information. Responsive to the first coupled structured information being found within the one or more data sources, the first coupled structured information may be obtained and the search for the second coupled structured information may not be performed. Responsive to the first coupled structured information not being found within the one or more data sources, the search for the second coupled structured information may be performed.

For instance, data from one source may be considered more reliable and/or accurate than data from another source. If the data is found in the more reliable and/or accurate source, then alternative data from the less reliable and/or accurate source may not be obtained. For example, drilling data may usually be available from WellView system. More accurate drilling data may be stored in WITSML database, but may not be always available. If the WITSML data is found, then the WITSML data may be used. If the WITSML data is not found, then WellView data may be used. If WellView data is not accurate and/or is incomplete, the data may be modified/entered by the user. In some implementation, the data may be modified/entered by the user by having the user couple the inaccurate/missing data with unstructured document including the relevant data.

In some implementations, information from all available sources may be obtained for use/potential use. For example, information from all available sources may be aggregated for user to identify potential discrepancies and/or to select the data/sources to be used. In some implementations, information may be obtained manually from a user. For example, if a piece of information is not available in the preferred source, the search for the piece of information may be continued in alternative source(s). If the piece of information is not found in the alternative source(s), a user may be provided with an option (e.g., fill-in slots, forms) to manually enter the piece of information.

Coupling of information may be performed based on user input and/or other information. User input may be received through user's interaction with one or more user interfaces. For example, coupling of information may be performed based on user annotation and/or chain of user decision. For instance, a chain of decisions may be made by a user and supported by the system. At individual step (following step) in the chain, the user may leverage decisions (conclusions) made on the previous step. The system may capture the decisions in a form of structured data (e.g., drilling process parameters), with individual steps adding new insights into the data. For example, bit performance may be analyzed using performance data from different sources. As a result, the user may come up with a final decision on what that performance was. Then the system may then provide information (e.g., comparison) of similar performance data but across multiple wells. Such information may enable the user to determine which equipment performed the best. The system may then provide information on a planned well and enable the user to extrapolate the obtained knowledge.

In some implementations, the coupled unstructured information may be coupled to the well (e.g., coupled to the well itself, coupled to one or more features of the well, coupled to one or more drilling tools used with the well, coupled to one or more features of the drilling tools, coupled to other information relating to the well) based on user coupling of the coupled unstructured information to the well and/or other information. Pieces of the unstructured information may be coupled based on user interaction with one or more user interfaces (e.g., user tagging of information, user confirmation of coupling). The system may facilitate user coupling of information. For example, the system may ensure that the coupling is performed correctly (e.g., correct well or correct drilling tool is used), may check to confirm that values provided by the user, if any, stays within the applicable boundaries, and/or may suggest one or more values to be used based on information processing (e.g., natural language processing and/or word patterns search within an unstructured human-generated report).

In some implementations, the user coupling of the coupled unstructured information to the well may be facilitated by one or more computer-aided searches of unstructured information within one or more data sources. The searches of the unstructured information within the data source(s) may be facilitated through one or more information preparation. For example, searches of a piece of unstructured information (e.g., information contained within a document) may include search through the document and/or search through information extracted from the document through information preparation. Information preparation may extract relevant information from document into a searchable form, and may enable searching through the unstructured information without opening/analyzing the unstructured information itself. Rather, information extracted during information preparation may be used for searches.

For example, the computer-aided search(es) of the unstructured information within the data source(s) may include search(es) of character(s) (e.g., numbers, alphabets, symbols) extracted from unstructured files (e.g., file containing unstructured information, such as document files, presentation files, message files, image files, video files, audio files). The computer-aided search(es) of the unstructured information within the data source(s) includes one or more searches of the unstructured information for specific characters, specific combination of characters, and/or other information. For example, search(es) may be performed within the unstructured files and/or information extracted from unstructured file to find mentions (hits) of one or more features, one or more properties, and/or one or more logs of the well. For instance, unstructured file(s) including one or more text and/or one or more visual representations of a feature, a property, and/or a log of the well may be found responsive to the search of the unstructured information for the feature, the property and/or the log of the well.

In some implementations, portions of the unstructured file including the hit(s) may be presented, such as in a preview. Such preview of information contained within the unstructured file may enable a user to determine whether the information is relevant to well/well analysis and/or to determine how to couple the information. For example, portions of the unstructured file(s) including the text and/or the visual representation(s) of the feature, the property and/or the log of the well may be presented to facilitate user coupling of the unstructured file to the well. In some implementations, one or more links may be presented to enable user retrieval of the unstructured file(s).

For example, the preview of the file may not be enough for user to make determination on the relevant/coupling of the information contained within the file. The user may retrieve the file itself to review the file itself and make the determination. For instance, a hit unstructured file may include a report that mentioned one or more of the searched words, and the user may click on the link to down the report to look over the report and determine whether the report/portion of the report should be coupled to the well.

An example data preparation for unstructured information/files is provided below. The files may be divided based on file types (e.g., major document types, such as Documents, Spreadsheets, Presentations, Pictures and PDF documents). Identification of file types may be performed based on the file extension and/or other information. Individual file type may encompass a preconfigured set of extensions specific to that file type. The files may be analyzed, marked, and/or flagged as to whether they include particular content, such as textual content (e.g., document/image/video including visual representation of text), image content (e.g., presentation including images, videos), audio content (e.g., message with audio clip attached), and/or other content. In some implementations, specific content analysis/identification may be performed based on a preconfigured list of file types to be included within the analysis/identification. For example, documents and images may be processed to determine whether documents and images include textual content based on the preconfigured list including the corresponding document and image types. Specific types of files may be included within the list to process those types of images for extractions. In some implementation, one or more exclusion lists may list files to exclude from processing (e.g., exclude from whether file includes content, exclude from content extraction.

Information relating to the files may be extracted and aggregated for searching. For example, information relating to file name, file location, file size, file date (e.g., date of creation, date of modification), metadata, and/or time of processing of be extracted and/or stored in a searchable form (e.g., in a searchable database). In some implementations, an unstructured file may include a media file (e.g., an image file, a video file, an audio file), and the character(s) extracted from the media file may include text extracted from the media file (e.g., text extracted from image/video based on object detection, text extracted from audio based on audio analysis/word detection). For media files within another document (e.g., within a presentation, within a word document), one or more text near the media file may be extracted for the media file. For example, text in the other document (e.g., slide header, caption) may describe the media file, and inclusion of the text from the other document for searching of the media file may enable more accurate and/or comprehensive search results when searching for media files.

Files determined, marked, and/or flagged as including particular content may be put through content extraction/identification for the particular content. For files including textual content, the textual content may be extracted as plain text and added to the extracted/aggregated information for searching. For files including image content, thumbnails of the images/videos may be generated as preview of the image content and stored (e.g., in cloud storage). For files including image content, optical character recognition may be performed against the image/video and the resulted text may be added to the extracted/aggregation information for searching. In some implementations, object recognition (e.g., vision-based analysis of image/video) may be run against the image/video and the classification/probability of classification may be stored for the files. For example, images may be analyzed to determine probability scores that the images include a depiction of a bit or a BHA. The scores may be tracked in a search database in the corresponding entries for the images. The values may be used by user in selecting images for potential coupling. For example, user may use the scores as a guide to select images with higher probabilities and more quickly find/tag relevant pictures for a bit or a BHA.

In some implementations, the system may track whether the files have changed. The information extracted from a file may not be valid if the file content has changed. To maintain the data actual, the system may compare current state of files (e.g., on the drive) to the extracted/aggregated information (e.g., information stored in the search database). For example, the size, the modification date, and/or other information relating to the file may be monitored. If the file size has changed, then that file may undergo full content processing. If file's modification date has changed but the file sizes remained the same, the content may be extracted from the file and its checksum may be calculated. The checksum may be compared to the one in the extracted/aggregated information. If the checksum is different (because the content of the file has changed), file content may be re-uploaded (e.g., re-extracted for aggregation). This process may reduce the amount of read-write operations, time for processing, and overall load on the system. In some implementations, document processing timestamps may act as an indicator for the search engine to update its index. The example data preparation described above may greatly reduce the size of the information/files being searched (e.g., reduce size of search database to 0.8%-9% of original file size). Other data preparations for unstructured information/files are contemplated.

The merged view component 106 may be configured to effectuate presentation of one or more merged views of the coupled well information and/or other information. A merged view may facilitate analysis of the well(s) (e.g., wells selected by a user). A merged view may provide a view of the coupled structured information and the coupled unstructured information organized according to one or more predefined presentation formats. A merged view may provide a view of merged pre-aggregated information.

A predefined presentation format may refer to a standardized display format for presentation/organizing information. The predefined presentation format may define how different pieces of coupled structured information, coupled unstructured information, and/or other information may be arranged within one or more user interface for presentation on one or more display. The predefined presentation format may define how different pieces of coupled structured information, coupled unstructured information, and/or other information may be used to determine how information will be arranged within one or more user interface for presentation on one or more display.

A merged view may provide a view of the coupled information and preview information for comprehensive analysis of the well(s). The merged view may provide pieces of the coupled information together as a solid piece of information. In some implementations, the merged view may indicate from what data source(s) the information was obtained. The merged view may provide comprehensive view of one or more wells, with the information relating to features of the wells/drilling tools arranged for easy analysis/comparison.

The information provided within the merged view may be interactive. A user may interact with user interfaces presenting the merged view to manipulate the information (e.g., add, delete, and/or change the information; run computer analysis of the information).

FIGS. 3, 4A, 4B, 5, 6, 7A, 7B, 8, 9A, 9B, 9C, 9D, 10A, 10B, 10C, 11, 12A, 12B, 12C, 12D, and 12E illustrate example user interfaces for aggregating and presenting information for well analysis. The user interfaces shown in these figures may include standalone interfaces and/or may form parts of one or more user interfaces. For example, two or more of the user interfaces may be part of the same user interface. These user interfaces are shown as examples, and other types of user interfaces and other arrangements of user interface elements are contemplated.

Figure 3:
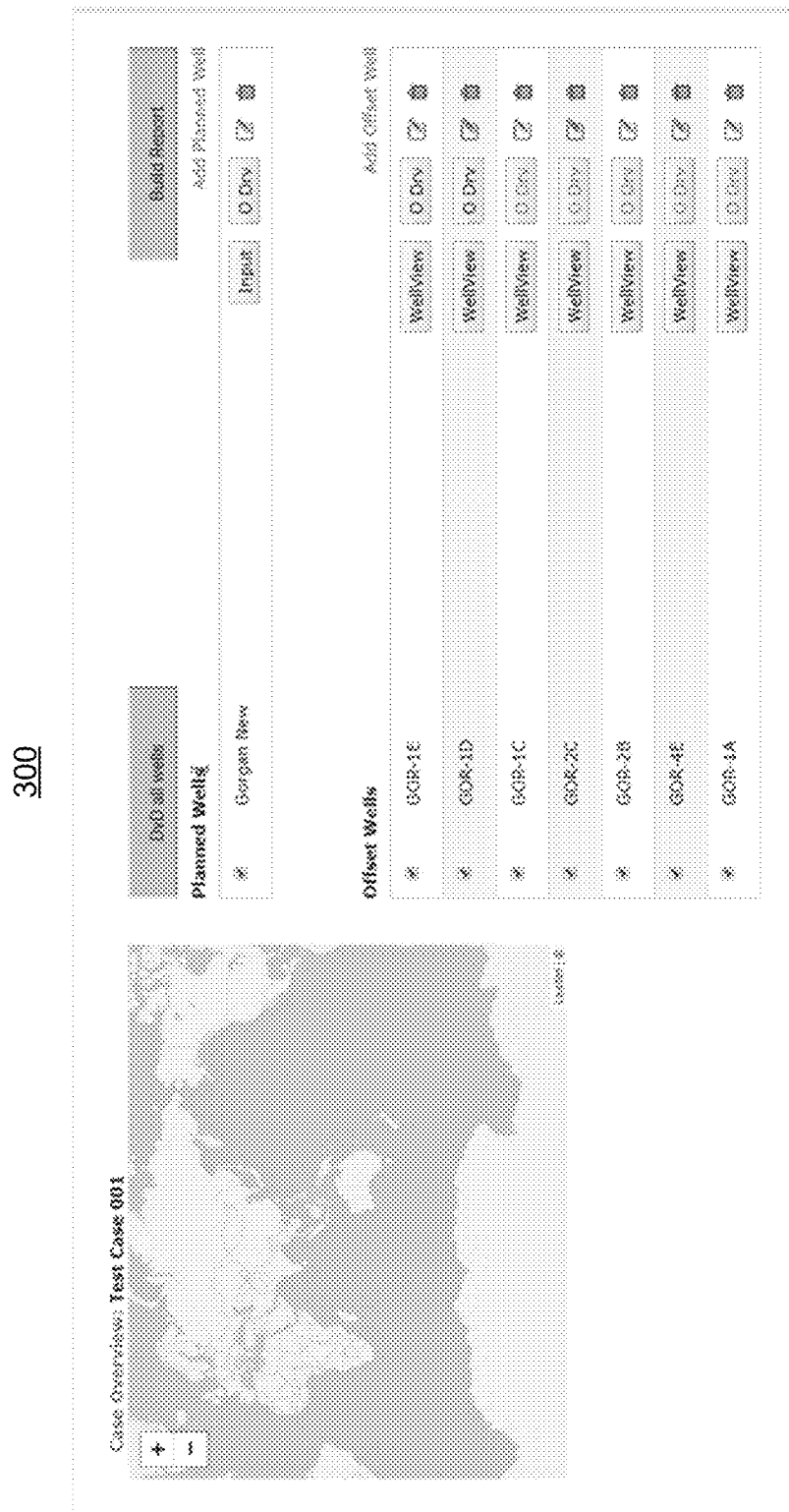
Figures 4A, 4B:
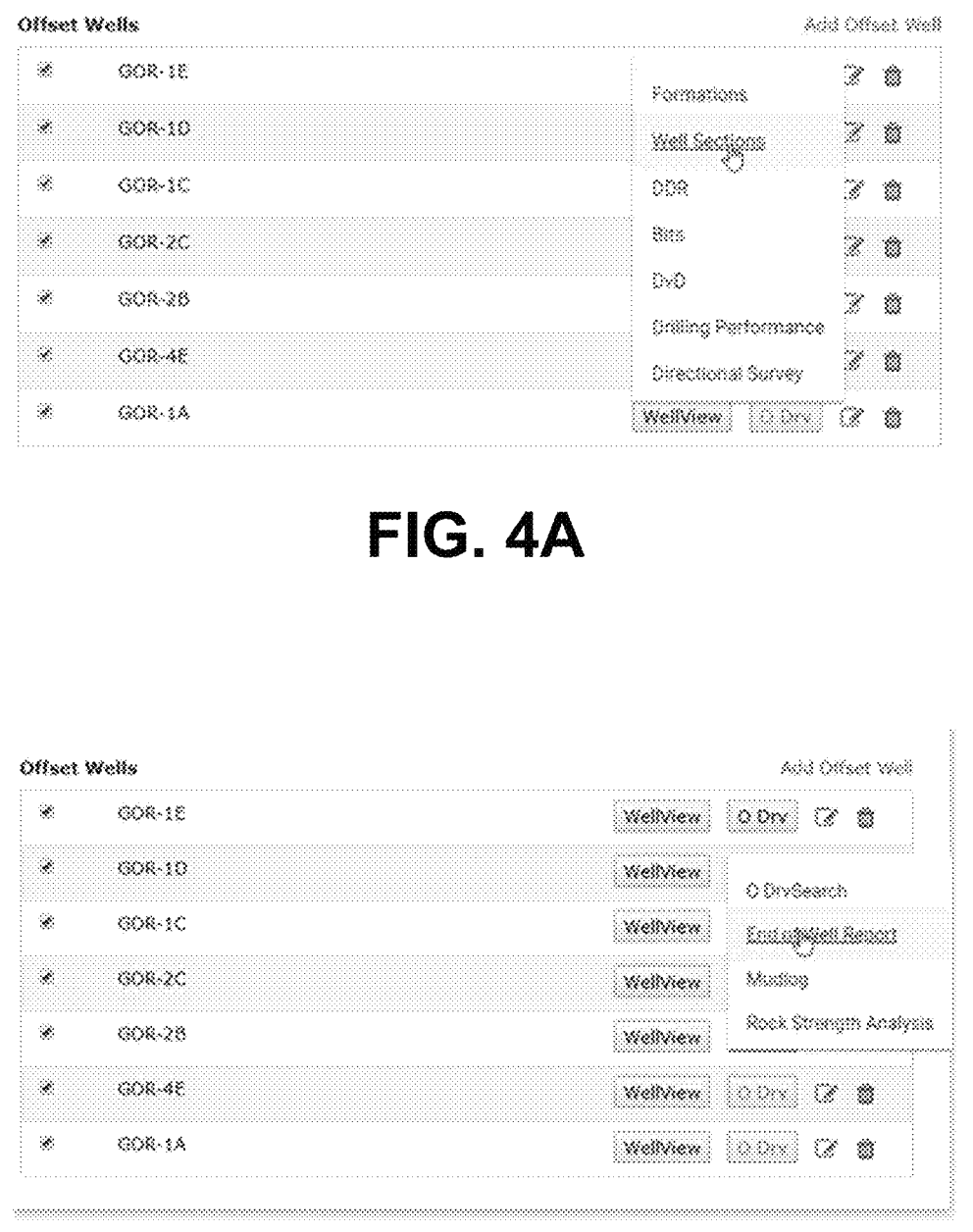

FIG. 3 illustrates an example project user interface 300. The project user interface 300 may include a view of wells included within a project. The project may include one or more planned wells, one or more offset well, and/or other wells (e.g., one planned well and seven offset wells). One or more of the wells may be selected (e.g., via interaction with box to the left of well names) for inclusion in a comprehensive (e.g., final) report. The comprehensive report may be generated based on user interaction with the build report button. Clicking on the WellView button may result in the project user interface 300 showing a listing of reports based on information/analysis obtained from WellView. An example listing of reports based on information/analysis obtained from WellView is shown in FIG. 4A. A user may select on the name to see the corresponding report. O Drive may refer to a share drive in which unstructured information/files are stored. Clicking on the O Dry button may result in the project user interface 300 showing a listing of unstructured information/files that have been coupled (e.g., tagged) to the corresponding well. An example listing of coupled unstructured information/files is shown in FIG. 4B. A user may select on the name to see the corresponding unstructured information/files (e.g., unstructured files tagged as being End of Well report) and/or the searches performed to couple (e.g., tag) the unstructured information/files.

Figure 5:
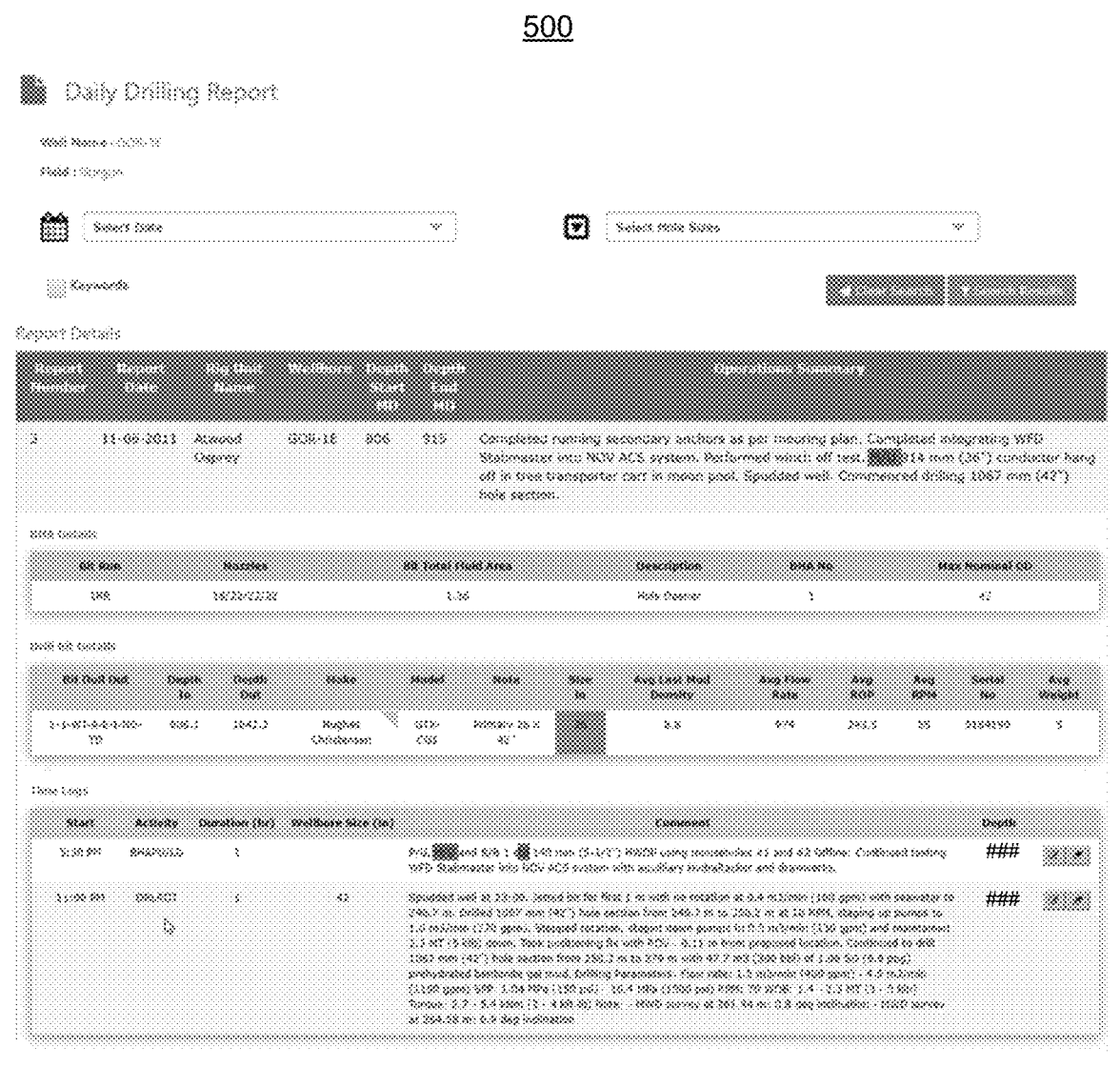

FIG. 5 illustrates an example daily drilling report user interface 500. The daily drilling report interface 500 may be presented responsive to user selection of DDR from the listing of reports shown in FIG. 4A. The daily drilling report user interface 500 may present information on individual daily drillings for a selected/corresponding well. The information shown in the daily drilling report user interface 500 may be filterable by date(s) and/or by hole size(s). The daily drilling report user interface 500 may include organized view of information contained in daily drilling reports, with the information sectioned by report number, with individual report numbers including information on BHA details, drill bit details, and time logs. The time logs may provide information on individual activities in the well by activity time. Information provided in the daily drilling report user interface 500 may include information pulled from a number of different files/different places within a file. The organized view of information shown in the daily drilling report user interface 500 may provide comprehensive view of the well for user analysis. In some implementation, one or more words/combinations of words in the daily drilling report user interface 500 may be highlighted so that users can easily spot where certain words/combinations of words (e.g., key words) are found.

In some implementations, user interaction with the daily drilling report user interface 500 may cause the daily drilling report user interface 500 to show other information. For example, clicking on a triangle next to the make of a BHA may result in the daily drilling report user interface 500 displaying a window listing the components of the BHA.

Conventionally, a user may be able to retrieve a single day of daily drilling report at a time. To compare information from multiple days of daily drilling reports/multiple reports, a user may need to print out the reports and look at them side-by-side. The daily drilling report user interface 500 may provide a comprehensive view of information from multiple days of daily drilling reports/multiple reports. The daily drilling report user interface 500 may provide views of information from individual daily drilling reports by group (e.g., information from one day grouped into one ribbon, information from next day grouped into next ribbon). The daily drilling report user interface 500 may provide a timeline view of the information from multiple daily drilling reports, enabling users to see the recorded information in timeline and understand recorded events in a time sequence.

The time logs portion of the daily drilling report user interface 500 may provide information relating to specific activities for drilling. The depth at which the activities occurred may be entered by a user. The user may determine the depth at which the activities occurred based on the information presented within the daily drilling report user interface 500. For example, the user may use information in the comment section. The comment section may include information entered by an operator while/after drilling. Using the information from the comment section, the user may set the value of depth for the activity.

In some implementations, textual recognition (e.g., natural language processing tool, machine learning tool) may be performed on the information within the comment section. Textual recognition may detect keywords, words defining relationships in depth (e.g., from/to, dash/hyphen between numbers) to identify probably depths of the activities. In some implementations, measurements in different standards within the comments may be converted into one standard. In some implementations, the value of depth for an activity may be suggested. In some implementations, the value of depth entered/confirmed by the user may be checked to determine whether the value falls within an acceptable range of values (e.g., within the drilling depth for the day, for the specific operation). Based on the value falling outside the acceptable range of values, one or more error messages and/or one or more warnings may be provided to the user.

Figure 6:
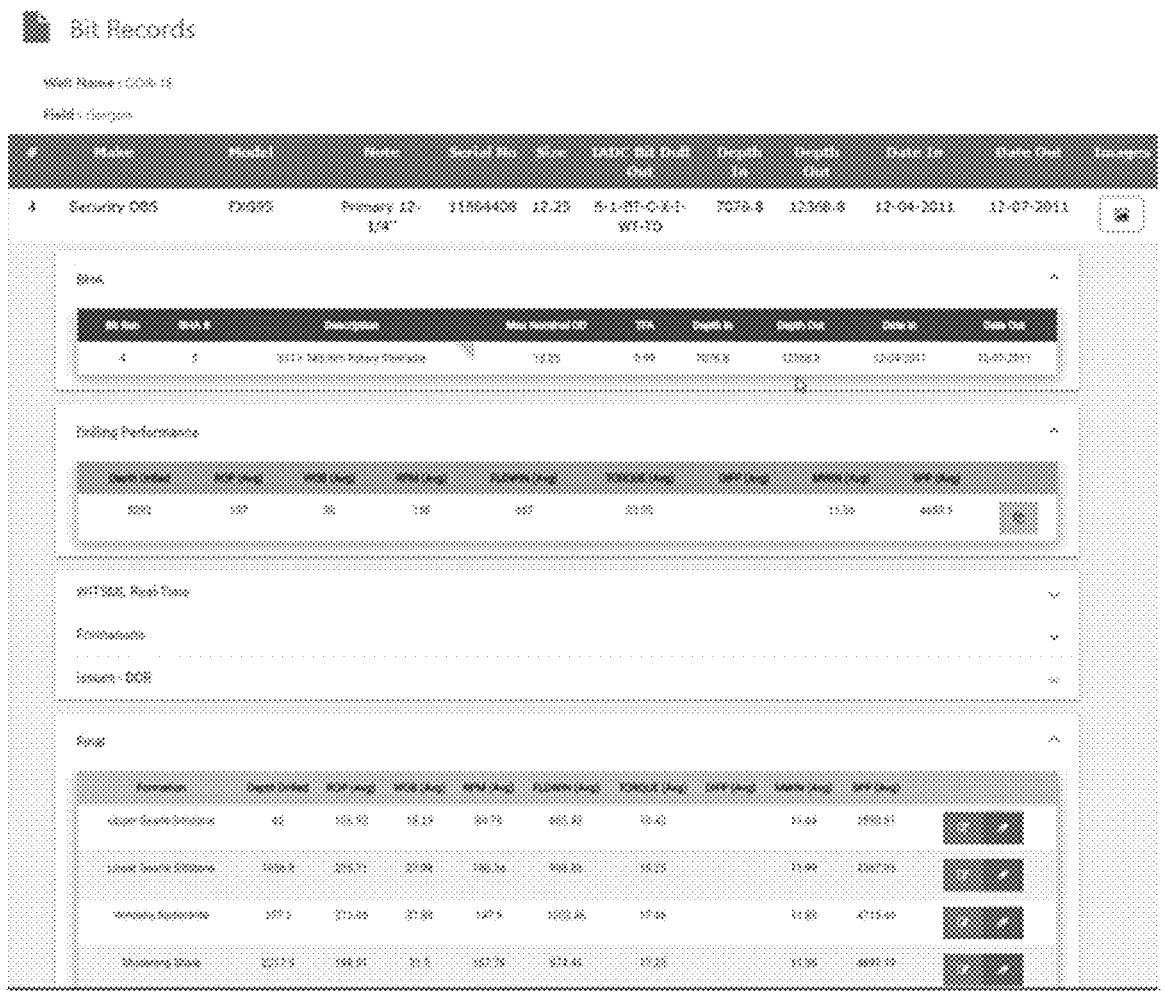

FIG. 6 illustrates an example bit records report user interface 600. The bit records report user interface 600 may be presented responsive to user selection of Bits from the listing of reports shown in FIG. 4A. The bit records report user interface 600 may present information on bits/BHAs used in drilling. Information presented within the bit records report user interface 600 may include information aggregated from different sources/places. The bit records report user interface 600 may provide a summary of the information from different places, with the relevant information extracted from different sources based on coupling between pieces of information.

For example, the bit records report user interface 600 may provide information on the bit/BHA that was used. A user may click on a triangle next to the make of a BHA may to see a window listing the components of the BHA. Conventionally, a user may have to look at a separate document (e.g., components document) to find the components of the BHA, and then narrow which components were used based on date of use, bit, well, depth, and/or other information. This manual process is time-consuming and difficult, especially since different document may arrange information differently (e.g., by time, by depth, by bit). The bit records report user interface 600 may provide information on the drilling performance. The information provided within the drilling performance section may be summary information pulled/determined from one source, such as WellView. This summary information may not necessarily be accurate (e.g., due to simple, rather than detailed, calculation of number, due to source of information, such as operators inputting numbers during drilling), and the user may use the information provided within the bit records report user interface 600 to confirm/modify the information for final determination of performance.

The user may interact with the bit records report user interface 600 to see media files related to the bit/BHA. For example, the user may click on the image icon in the upper right section of the bit records report user interface 600 to see images, videos, audio, and/or other media files that were identified (e.g., tagged) as being relevant to this bit/BHA. Looking at the visual appearance of the tool before, during, and/or after the drilling may be important to understanding drilling performance and adequacy of the tool for particular drilling. For example, a bit that showed good performance according to values shown in the drilling performance may have ended the drilling looking worn and/or cracked. Looking at the visual appearance of the bit in images/videos may enable a user to determine that the bit is not a good candidate for similar drilling operations.

Figure 7A:

FIG. 7A illustrates an expanded view 710 of the bit records report user interface 600. The expanded view 710 may present information on drilling performance, as well as information from WITSML real-time-data (e.g., average WITSML, WITSML data, information on formation, comments on issues, and/or other information. The information provided within the WITSML section may include information captured from the tool (e.g., from tool sensor readouts), analyzed based on formations (e.g., types of formations, whether the entire or portion of the formation was drilled), and/or other information. The average WITSML data may more accurately summarize drilling performance as its computation may take into account drilling at different depths and formations, rather than providing a simple average (e.g., shown in drilling performance section).

The formation section may provide information on formation that the specific tool went through. Conventionally, this information is determined by using depth ranges traveled by the tool and formation depths at corresponding location. The expanded view 710 may include formations determined based on computer analysis of the coupled information.

The issue section may provide issue description that events that occurred within the depth ranges covered in the expanded view 710. The issue descriptions may include information entered by an operator while/after drilling. The information entered by the operator may originally not be tied to any particular depth. Rather, the operator may enter information as comments for different activities that occurred during drilling. The depth for individual activities may be set (e.g., value manually entered, suggested value confirmed, suggested value modified) by a user, such as through interaction with the time logs section of the daily drilling report user interface 500. For example, the user may have entered the depth value of 8,200 for an activity description in the comments. User entering of the depth value may couple the activity description in the comments to the set value for the tool. The expanded view 710 may include the corresponding comment in the issue sections based on the shown drilling depth range including the depth of 8,200. Thus, the expanded view 710 may automatically provide description of activities that may/should be considered when a user looks at other information provided within the expanded view 710. For example, the comments in the issue description may provide context/suggest reasons why certain operation happened differently than expected/planned. Thus, a user decision in another step of the process may impact what information is displayed to the user later in the process. Other views within the user interfaces may provide same/similar information (e.g., report graph user interface 1010 shown in FIG. 10A). Uses of other user input to couple information are contemplated.

A user may click on a copy/paste button to the right of the rows of information to add the corresponding row of information to final comparison section. An example final comparison section 720 is shown in FIG. 7B. Thus, a user may review the information shown in user interfaces (e.g., user interfaces 600, 710) and decide which of the information will be used for final comparison on tool performance. A user may select to manually add a record by clicking on the Add New Record button. A user may modify one or more of the values that were copied and pasted into the final comparison section 720. By using the final comparison section 720, a user may be able to determine which tool should be used for a particular operation (e.g., for drilling a particular formation).

Figure 8:
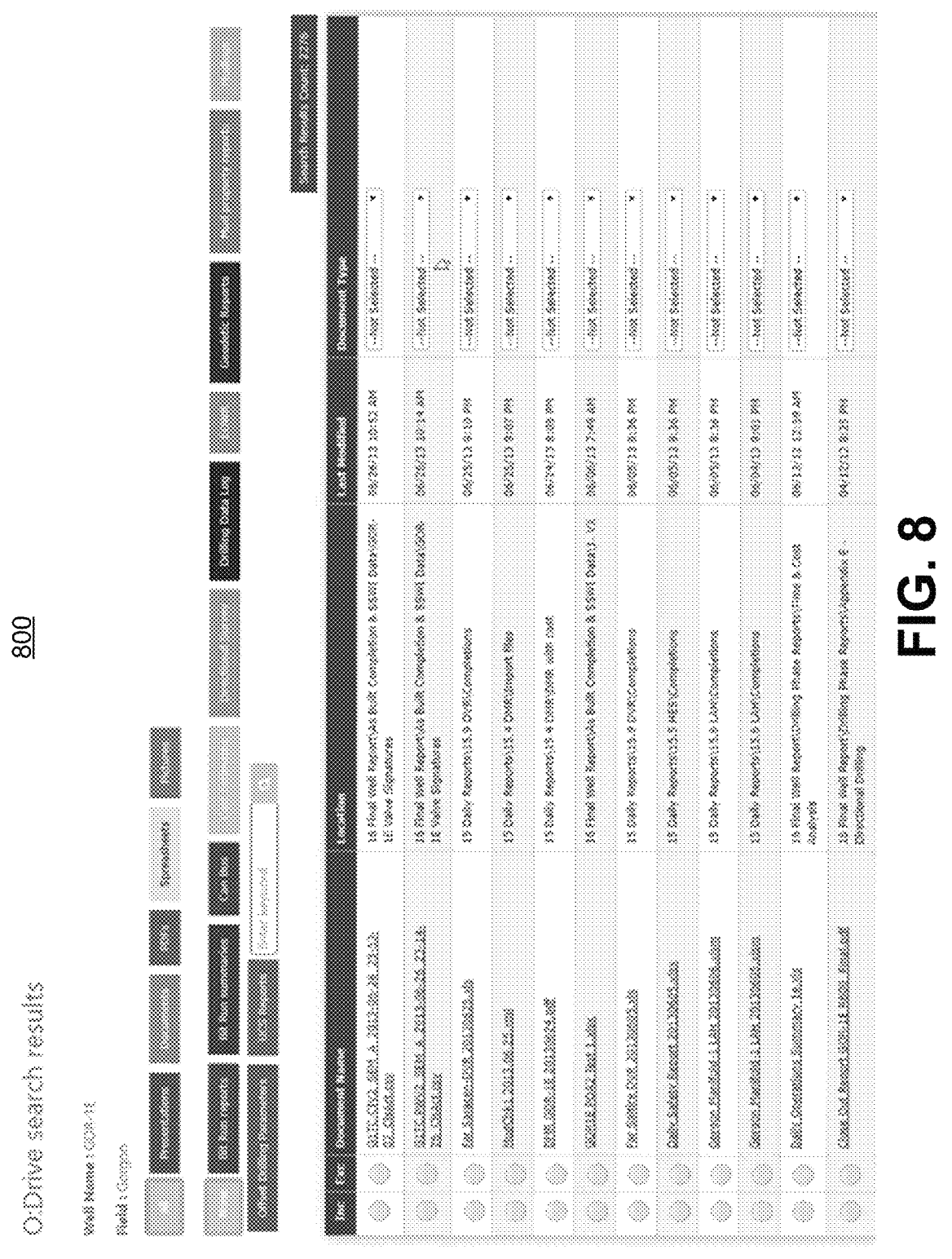

FIG. 8 illustrates an example search interface 800. The search interface 800 may include tools to search for relevant unstructured information/files within one or more locations (e.g., a particular top folder and sub-folders in a hard/shared drive). For example, the search interface 800 may show results of searches within folders corresponding to a well GOR-1E. The search interface 800 may include selectable options for users to customize their searching. For example, the search interface 800 may include selectable options to determine which types of information/files (e.g., presentations, documents, PDFs, spreadsheets, pictures) will be included within the search. A user may select All, or one or more of the individual options. The search interface 800 may include selectable options to determine what search logic will be used in the search (e.g., Bit Run reports, Bit Run summaries, etc.). A user may select None, or one or more of the individual options. A user may use the Enter Keyword field to enter custom search words.

The search result section may provide a listing of information/files that met the search criteria (e.g., matches the file type and includes search words). The search result section may show the file name, the file location, the date of the file (e.g., last modified). The search result section may include options for user to identify the type of the file. The type of the file designated (e.g., selected, tagged) may be used to couple the file (unstructured information) to a well (e.g., coupled to the well itself, coupled to one or more features of the well, coupled to one or more drilling tools used with the well, coupled to one or more features of the drilling tools, coupled to other information relating to the well). The type of the file designated (e.g., selected, tagged) by the user may be used to determine the structure of the information contained within the file and/or how to use/interpret the information contained within the file.

For example, selecting a pulldown menu under the Document Type may include a listing of possible document types by which the file (unstructured information) may be tagged. Example listing of document types include bit picture, BHA picture, EOWR (end of well report), mud log, mud property report, bit run report, bit run summaries, drilling data log, offset drilling parameters, UCS report, directional survey, geodetic report, rock strength analysis, and/or other document types. Tagging a file with a particular document type may enable analysis based on the known predefined structure of the document type. For example, tagging a file as a mud log may enable analysis of information contained within the file based on structure of mud log. Tagging a file with a particular document type may couple the file with the corresponding well (e.g., GOR-1E).

In some implementation, a user tagging a file with a document type may result in the file being tagged for the project. The user tagging of the file may not impact the file's status in other projection. In some implementations, a user tagging a file with a document type may result in the file being tagged across projects. That is, a user's designation of an unstructured file as a particular type of document may be used across different projects. Such shared tagging may enable a single tagging of an unstructured file across multiple projects. That is, once an unstructured file has been tagged in one project, it does not need to be tagged again in another project. The data from the tagging in one project may be used/available for use in other projects. In some implementations, a user tagging of a document type may be used by/across multiple users.

In some implementations, conflicts in document type across projects may be detected. For example, if a user attempts to tag a file as being of a particular type different from previous tagging, the user may be presented with an error or a warning message. A user may be required to receive approval from other user(s) that previously tagged the document before the document type may be changed.

In some implementations, the system may detect multiple versions of a file. For example, the system may detect that the searched location(s) include multiple and different versions of a file (e.g., multiple versions of a presentation). The user may be provided with options to select which one(s) of the versions will be used for analysis. In some implementations, the owner of the file (e.g., the content creator, content modifier) may be prompted to mark which version of the file should/should not be used.

In some implementations, user tagging of documents may be aggregated and used to train one or more machine learning tools, such as classifiers, to automatically tag unstructured files. One or more of the information available for document type analysis (e.g., file name, location, preview, content) may be used as input to the classifier and the types of the document selected by the users may be used as truth to compare the training output of the classifier. As users use the system to tag the unstructured files, the training dataset may grow to more accurately train the machine learning tools.

Figure 9A:

In some implementations, one or more previews of the files listed in the search result section may be shown. For example, FIG. 9A illustrates an example search interface 910 with a preview of one of the listed filed. The preview may be shown responsive to user interaction (e.g., hovering over, clicking, holding) the triangle button next to the file name. The preview may include text extracted from the file (e.g., text within the search database for the file). Terms matching the searching criteria may be highlighted within the preview. As another example, FIG. 9B illustrates an example search interface 920 with a preview of a listed image. The preview may include a lower-resolution thumbnail of the image. A preview of the image may enable a user to determine more quickly whether the image is relevant or not, than based on looking at the text extracted from the image.

Figure 9C:
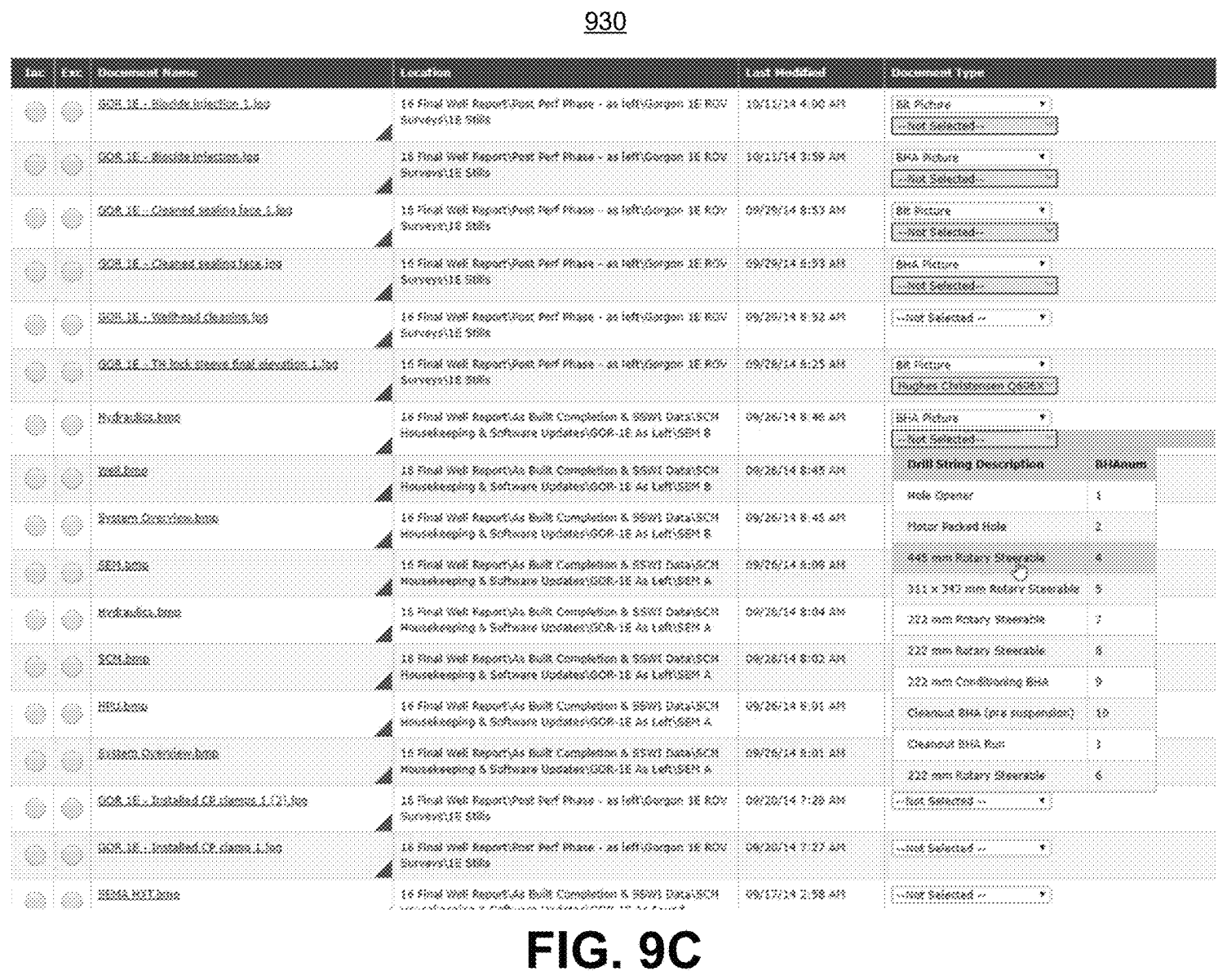

In some implementation, one or more additional options may be presented within an interface based on user selection of a document type. The additional option(s) may enable the user to further define the document type. The additional option(s) may enable the user to select additional information to perform coupling of the unstructured file. For example, FIG. 9C illustrates an example search interface 930 in which a user has selected an image to be a BHA picture. Based on selection of the BHA picture as the document type, the search interface 930 may provide options for the user to select which of the BHAs/which components of the BHA the picture depicts. For example, the corresponding well may have used different bit/BHA, and simply designating the image as a BHA picture may not provide sufficient information to organize the image. The options may list the bit/BHA that were used, and the user may select the particular bit/BHA to couple the image to the particular bit/BHA.

FIG. 9D illustrates an example search logic interface 940. The search logic interface 940 may enable a user to set up predefined searches that may be performed to find potentially relevant unstructured files. The search labels may define the names by which the predefined searches may appears in the search interface. The search phrase may define the logic used in the corresponding search, such as one or more terms, one more phrases, OR combinations, AND combinations, word relationships (e.g., a term appearing within a certain distance of another word), and/or other logics. For example, the search EOWR may include searching for files that include the term EOW or the phrase "end of well report."

FIGS. 10A, 10B, 10C, and 11 illustrate example user interfaces for presenting comprehensive (e.g., final) report. Views included within one or more of the user interfaces shown in FIGS. 10A, 10B, 10C, 11 may be generated responsive to user interaction with a user interface to generate a comprehensive report, such as based on a user clicking on the Build Report button shown in FIG. 3.

Figure 10A:
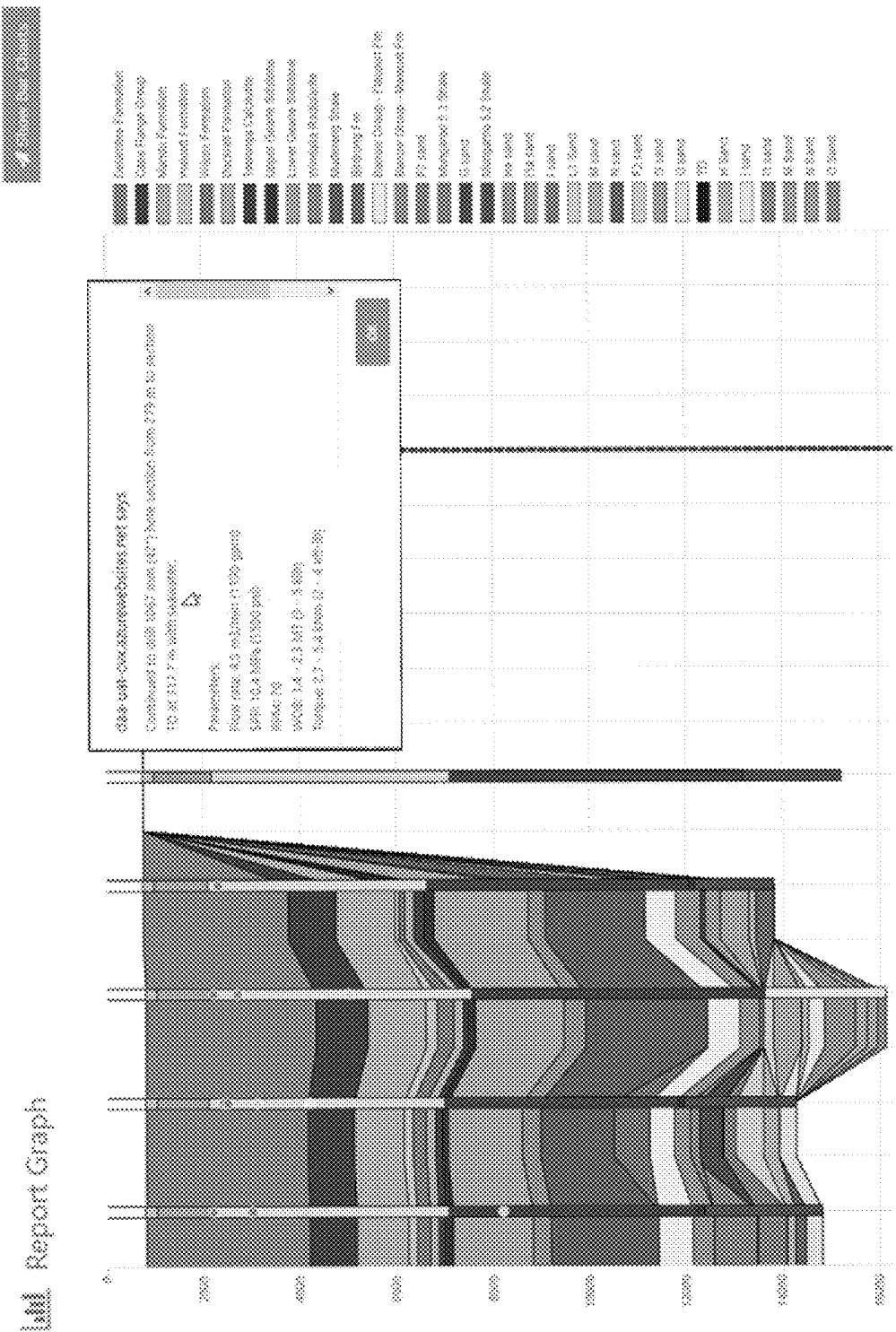
Figure 10B:
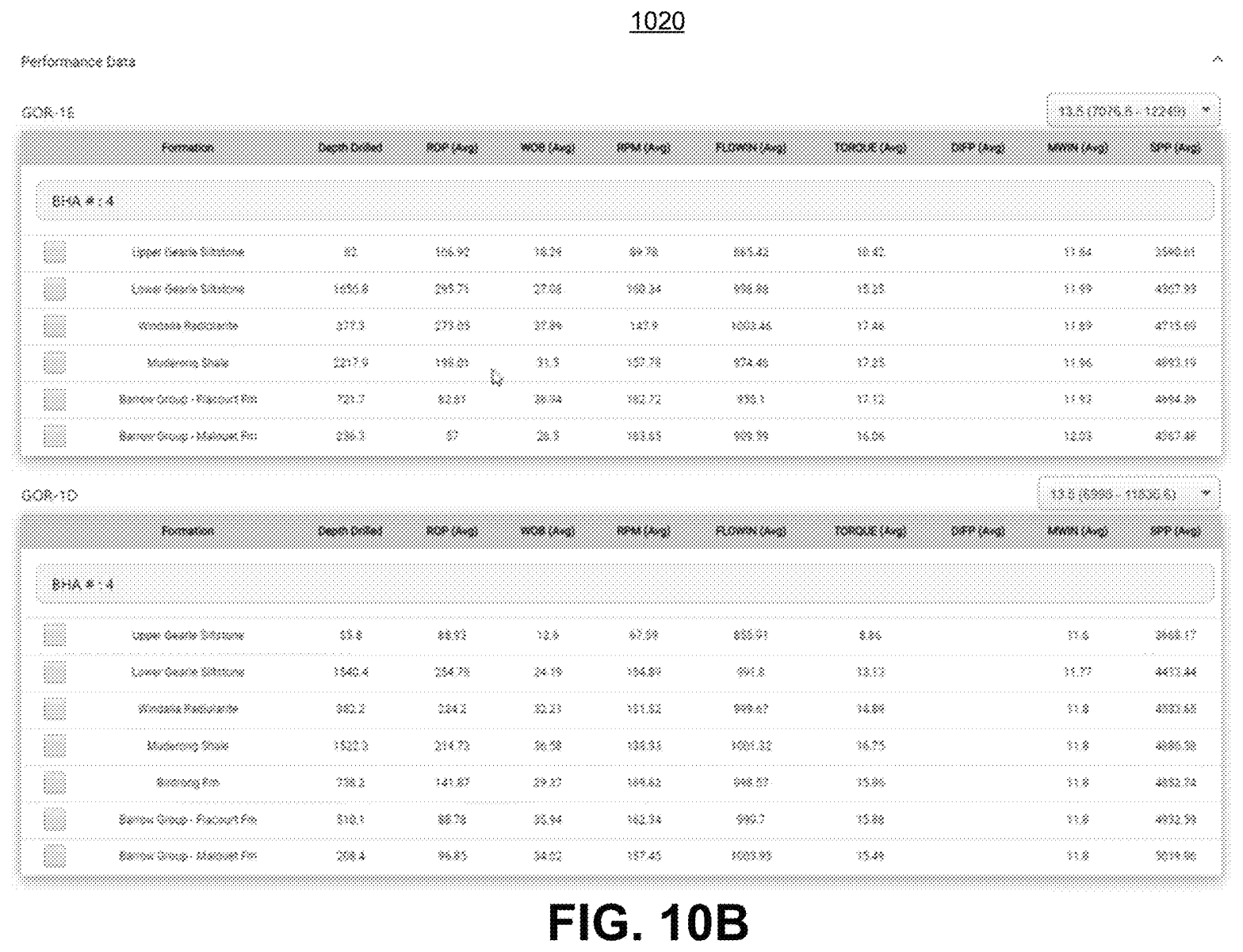

FIG. 10A illustrates an example report graph user interface 1010. The report graph user interface 1010 may include a visual representation of wells included within the project. The visual representation may show different formations through which the wells were drilled. The visual representation may include indicators (e.g., circles) for events that were recorded for the wells. The indicators may appear at the depths of the events. In some implementations, the depth for the events may be tied to the depth entered by the user for the event (e.g., depth for the activities entered using daily drilling report user interface 500). A user may interact with an indicator to see more information about the event, such as shown within the box window. The visual representation may show the different sections of wells, as well as how the different sections are positioned with respect to different formations. Providing a visualization of the events, sections, and formations may enable users to analyze different parts of the well(s) using the comprehensive view of the wells. For example, same events that happen across the same formation may be easily seen within the visualization, while detecting that same events occurred in the same formation simply using daily drilling reports may not be as easy as the depth of formation may change based on well location.

Figure 10C:
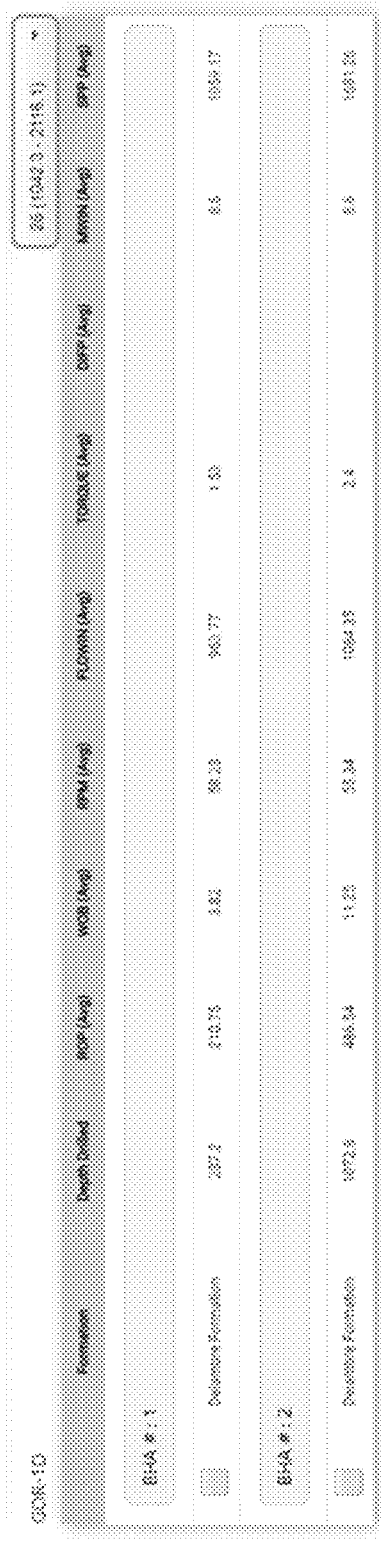

The report graph user interface 1010 may enable a user to select one or more of the sections to see more information about the selected section(s). For example, performance information for the selected sections may be shown within the report graph user interface 1010 (e.g., below the visualization of the wells) or within another user interface. Example performance information for the selected sections are shown in performance data view 1020 of FIG. 10B. Performance data view 1030 of FIG. 10C illustrates example performance information for a selected section in which two different BHAs were used. The numbers shown in the upper right of individual groups of information may indicate/reflect the selected sections. The performance values listed may include the values from the final performances decided by the user (e.g., such as shown in FIG. 7B).

A user may select boxes along the left side of the user interfaces 1020, 1030 to select which performance information will be compared in a comparison table. An example performance comparison window is illustrated in FIG. 11. Thus, a user may use the aggregated/coupled information to analyze the wells and determine which information should be used for comparison. A user may analyze the values provided in the comparison table to determine relative performance of different operations. For example, values may be compared to determine best performing operation, worst performing operation, operation with outlier values, and/or other operations. In some implementation, the performance information may be ordered based on one or more performance indications. For example, the performance information may be ordered in order of best/worth performance. In some implementation, one or more graph representations for individual and/or combination of performance parameters may be provided to enable visual analysis of performance comparison.

Figure 12A:
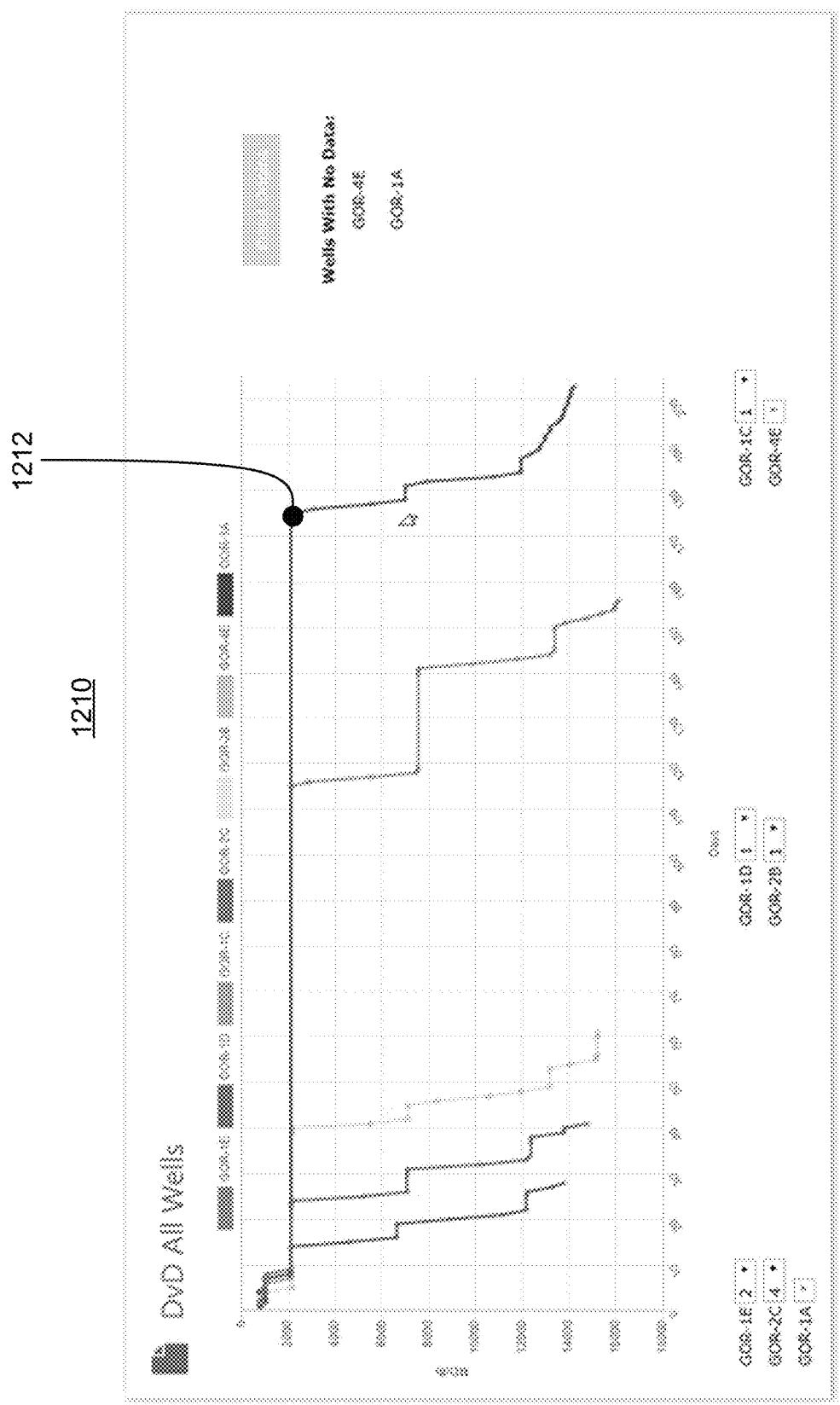
Figure 12B:
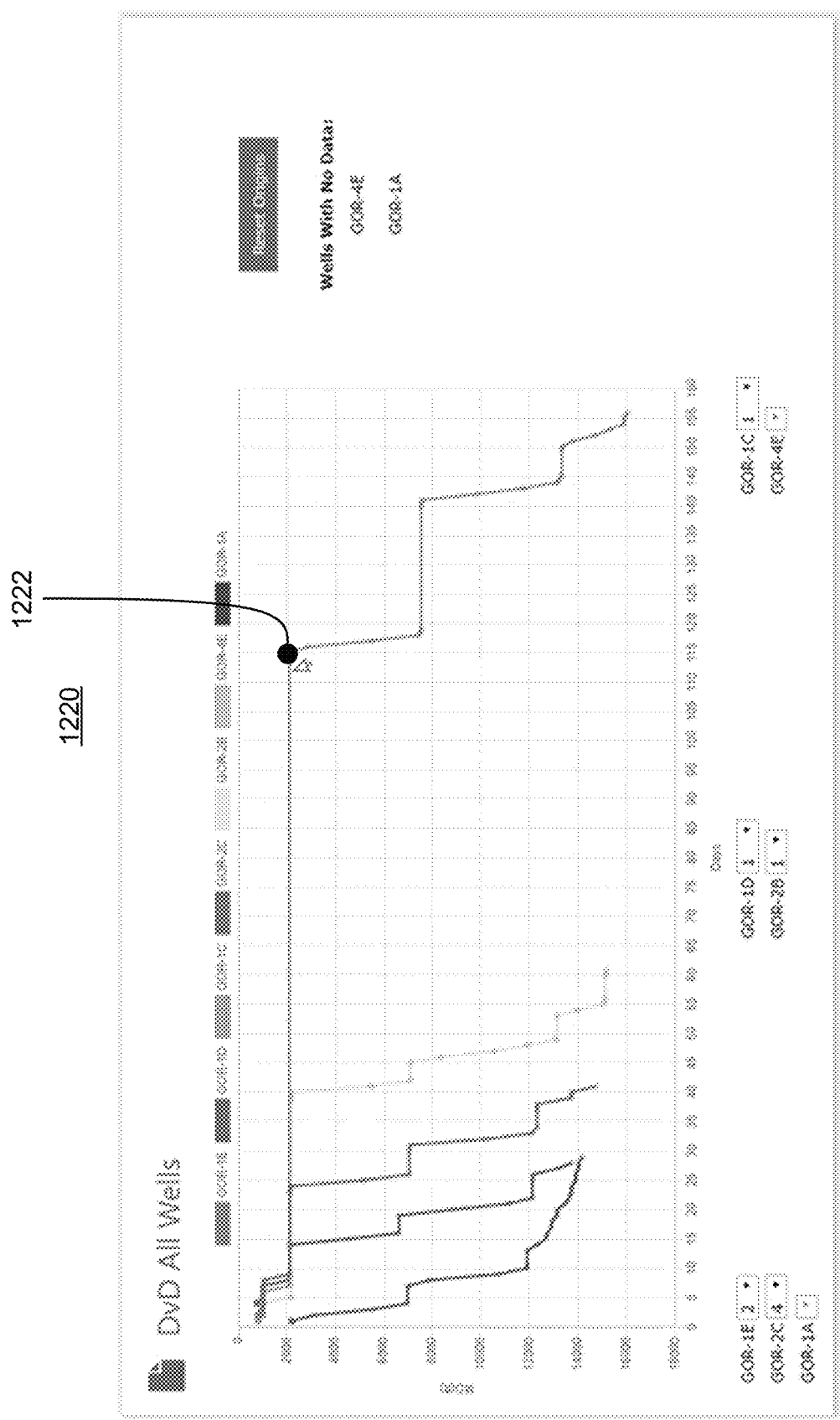
Figure 12C:
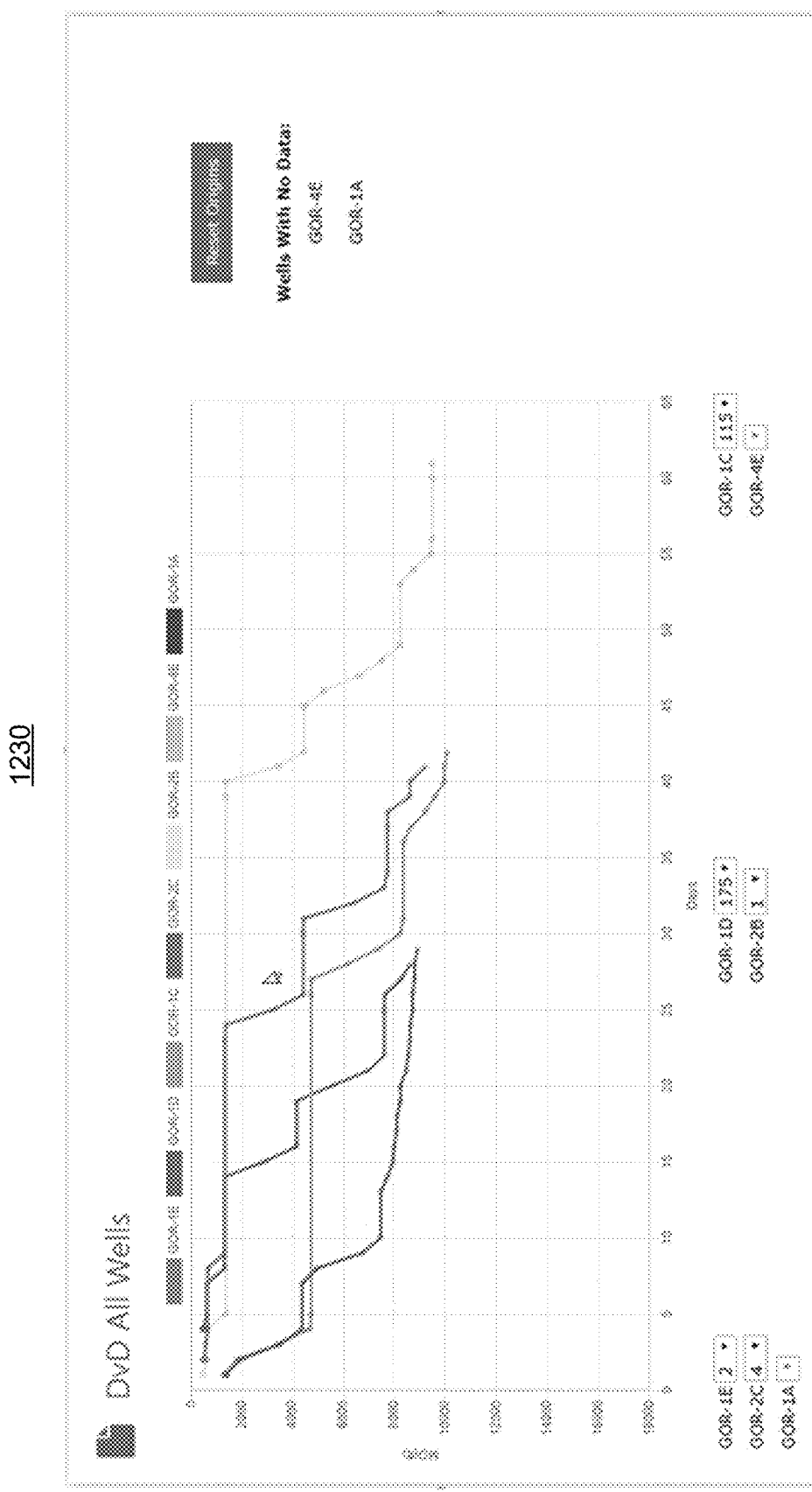
Figure 12D:
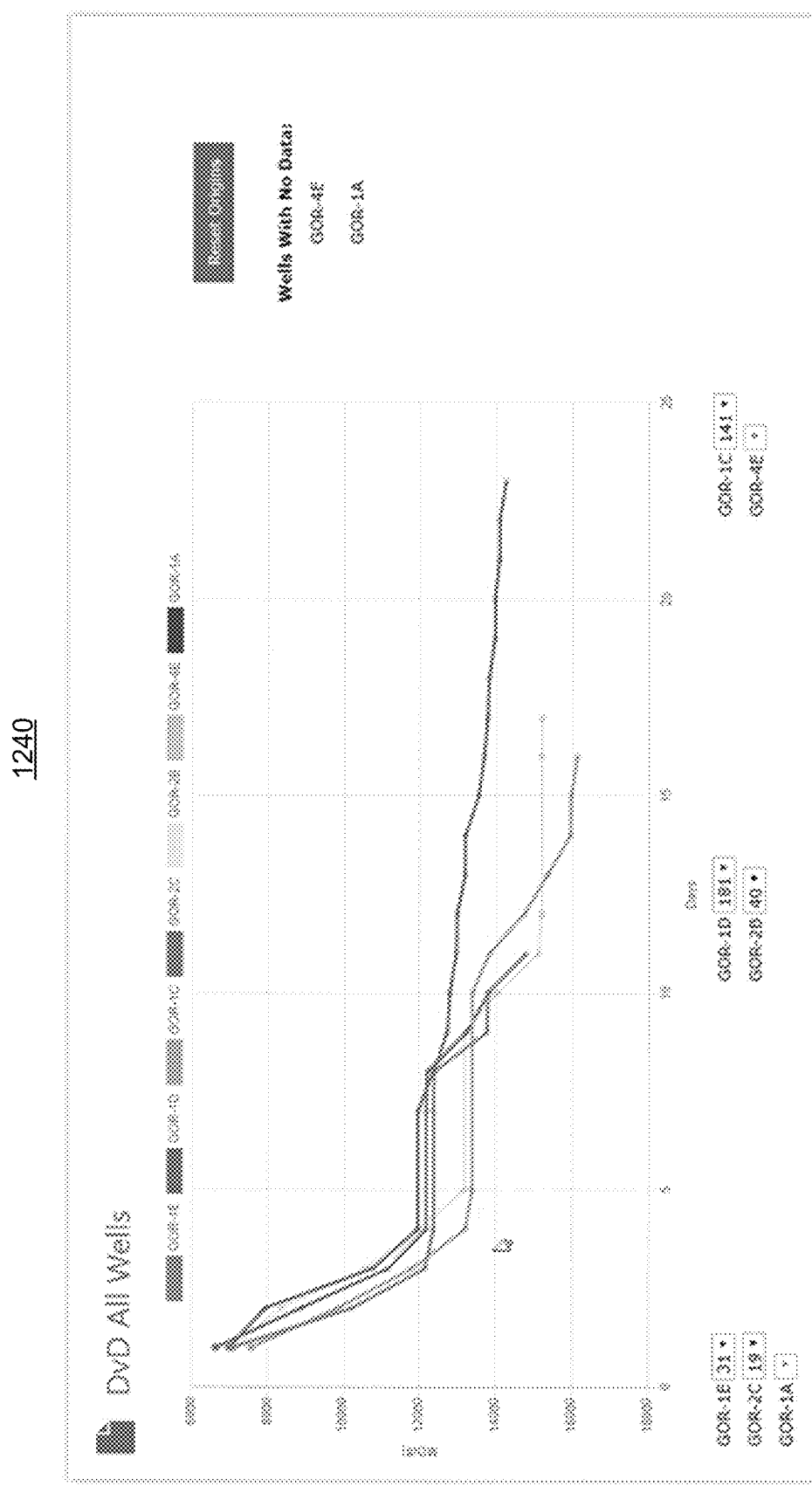
Figure 12E:
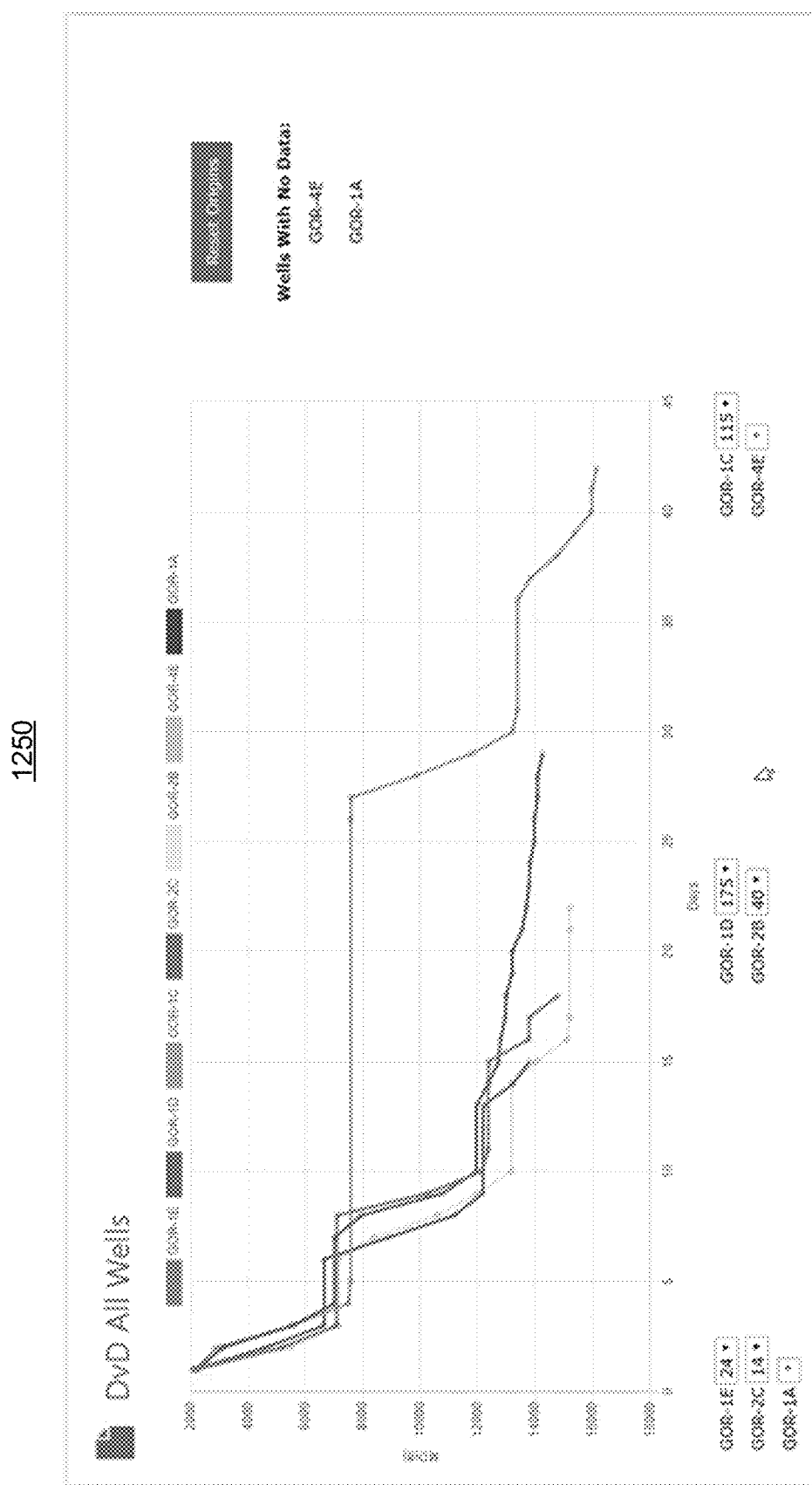

FIGS. 12A, 12B, 12C, 12D, and 12E illustrate example user interfaces for presenting graphical representations of drilling performance comparisons. Views included within one or more of the user interfaces shown in FIGS. 12A, 12B, 12C, 12D, and 12E may be generated responsive to user interaction with a user interface element to generate a graphical comparisons, such as based on a user clicking on the DvD all wells button shown in FIG. 3. The graphical comparisons shown in these figures may be graphical representations of data series showing well depth progress in relation to days spent, which may be used as the indicator of drilling operations performance. However, as shown in FIG. 12A, it may be difficult to compare the inclinations/slopes of different lines because of how the lines are spread out. Data analysis/computational may not be able to properly distinguish/differentiate when the slopes of lines are due to poor performance, due to pause in drilling, due to change-up of drilling tool, and/or other factors that determine the slope of the lines.

The user interfaces shown in these figures may enable user to select the original point from which the lines should be generated. A user may be able to visually detect portions of lines that are not helpful for analysis. A user may select a point along the line to set the origin point for line generation. For example, the graphical comparison may change from a version 1210 in FIG. 12A to a version 1220 in FIG. 12B based on the user interacting (e.g., hovering over, clicking, holding) with an element 1212. The user interacting with the element 1212 may advance the section origin to the corresponding point and the correspond line may appear as the left most line in the version 1220. Similarly, the user interacting with an element 1222 may advance the section origin for the corresponding line to the selected point and the corresponding line may be moved to the left as shown in a version 1230 in FIG. 12C. Versions 1240, 1250 in FIGS. 12D and 12E may be generated based on additional user interaction with different parts of the line to move the origin point. Thus, a user may interact with the lines to identify section origins and the graphical comparisons may be rebuilt responsive to user interaction to enable user to select/customize which portions of the performance lines will be compared. The drop down boxes below the graphical comparisons may show the values of the origin points for the different lines/wells. The user may interact with the drop down boxes to set the origin point. That is, rather than interacting with the line graphs to set the origin point, a user may select one of the listed values in the drop down boxes to set the origin point. A user may move to one of the other user interfaces and/or other interfaces to see additional information about the well. For example, based on the graphical comparisons, a user may determine that the well GOR-1E performed best for the first part of the well. The user may go to other user interfaces to see how the drilling for that part of the well was performed. As another example, based on the graphical comparisons, a user may determine that the well GOR-1D performed poorly starting at day 175. The user may go to the daily drilling report for day 175 to find out the causes for the poor performance. Thus, the graphical comparison may visually indicate performance of different wells and may be used as a guide in user analysis of the well information.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
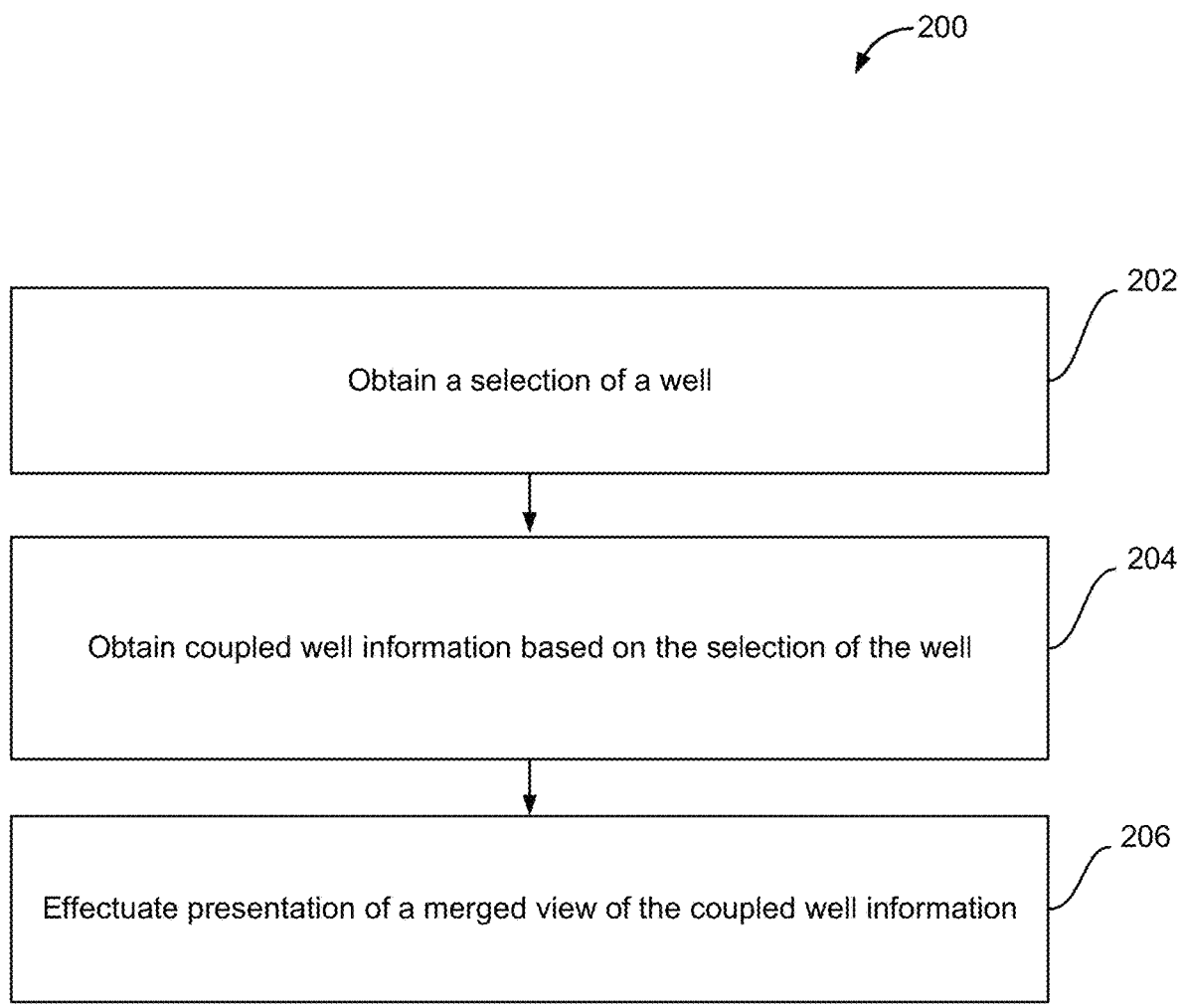
FIG. 2 illustrates an example method for aggregating and presenting information for well analysis.

FIG. 2 illustrates method 200 for aggregating and presenting information for well analysis. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, a selection of a well may be obtained. In some implementation, operation 202 may be performed by a processor component the same as or similar to the selection component 102 (Shown in FIG. 1 and described herein).

At operation 204, coupled well information may be obtained based on the selection of the well. The coupled well information may include coupled structured information and coupled unstructured information. The coupled structured information may include a portion of the coupled well information organized according to a known predefined structure. The coupled unstructured information may include a portion of the coupled well information not organized according to any known predefined structure. In some implementation, operation 204 may be performed by a processor component the same as or similar to the well information component 104 (Shown in FIG. 1 and described herein).

At operation 206, presentation of a merged view of the coupled well information may be effectuated. The merged view may provide a view of the coupled structured information and the coupled unstructured information organized according to a predefined presentation format. The merged view may facilitate analysis of the well. In some implementation, operation 206 may be performed by a processor component the same as or similar to the merged view component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for aggregating and presenting information for well analysis, the system comprising:
   one or more physical processors configured by machine-readable instructions to:
   obtain a selection of a well;
   obtain coupled well information based on the selection of the well, the coupled well information including information coupled to the well, the coupled well information including coupled structured information and coupled unstructured information, the coupled structured information including a portion of the coupled well information organized according to a known predefined structure, the coupled unstructured information including a portion of the coupled well information not organized according to any known predefined structure, wherein obtaining the coupled well information based on the selection of the well includes obtaining information indirectly coupled to the well via a chain of different information coupled to one another, further wherein responsive to first information being directly coupled to the well and second information being directly coupled to the first information, the second information is obtained as being indirectly coupled to the well via the first information; and
   effectuate presentation of a merged view of the coupled well information, the merged view providing a view of the coupled structured information and the coupled unstructured information organized according to a predefined presentation format, the merged view facilitating analysis of the well, wherein the merged view of the coupled well information includes a first graphical user interface or a second graphical user interface, wherein:

the first graphical user interface includes visual representation of wells included within a project, the visual representation showing different formations through which the wells were drilled, the visual representation including indicators for events that were recorded for the wells, the indicators positioned at depths of the events, wherein the visual representation of the wells provides a comprehensive view of the wells that includes visualizations of how different sections of the wells are positioned with respect to different formations and how events in different wells correspond to events in other wells; and the second graphical user interface includes lines that provide graphical representations of data series showing well depth progress in relation to days spent for multiple wells, wherein the second graphical user interface enables user selection of origin points from which the lines are generated, wherein the lines include a first line showing a first graphical representation of a first data series showing the well depth progress in relation to days spent for a first well, wherein responsive to user selection of a first point on the first line, a first origin point for the first line is set to the first point on the first line.

2. The system of claim 1, wherein the coupled unstructured information is coupled to the well based on user coupling of the coupled unstructured information to the well.

3. The system of claim 1, wherein:

the first information being directly coupled to the well includes the first information including information on a bit run connected to the well;

the second information being directly coupled to the first information includes the second information including images of a bit connected to the bit run; and the images of the bit are obtained as the coupled well information based on the images of the bit being indirectly coupled to the well via the bit run.

4. The system of claim 2, wherein the user coupling of the coupled unstructured information to the well is facilitated by a computer-aided search of unstructured information within one or more data sources.

5. The system of claim 4, wherein the computer-aided search of the unstructured information within the one or more data sources includes a search of one or more characters extracted from an unstructured file.

6. The system of claim 4, wherein the computer-aided search of the unstructured information within the one or more data sources includes a search of the unstructured information for a feature, a property, or a log of the well.

7. The system of claim 5, wherein the unstructured file includes a document file, a presentation file, a message file, an image file, a video file, or an audio file, further wherein the unstructured file is processed to determine whether the unstructured file includes textual content based on the unstructured file including the image file.

8. The system of claim 6, wherein:

an unstructured file including one or more text or one or more visual representations of the feature, the property or the log of the well is found responsive to the search of the unstructured information for the feature, the property or the log of the well; and portions of the unstructured file including the one or more text or the one or more visual representations of the feature, the property or the log of the well is presented to facilitate user coupling of the unstructured file to the well.

9. A method for aggregating and presenting information for well analysis, the method comprising:

obtaining a selection of a well;

obtaining coupled well information based on the selection of the well, the coupled well information including information coupled to the well, the coupled well information including coupled structured information and coupled unstructured information, the coupled structured information including a portion of the coupled well information organized according to a known predefined structure, the coupled unstructured information including a portion of the coupled well information not organized according to any known predefined structure, wherein obtaining the coupled well information based on the selection of the well includes obtaining information indirectly coupled to the well via a chain of different information coupled to one another, further wherein responsive to first information being directly coupled to the well and second information being directly coupled to the first information, the second information is obtained as being indirectly coupled to the well via the first information; and effectuating presentation of a merged view of the coupled well information, the merged view providing a view of the coupled structured information and the coupled unstructured information organized according to a predefined presentation format, the merged view facilitating analysis of the well, wherein the merged view of the coupled well information includes a first graphical user interface or a second graphical user interface, wherein:

the first graphical user interface includes visual representation of wells included within a project, the visual representation showing different formations through which the wells were drilled, the visual representation including indicators for events that were recorded for the wells, the indicators positioned at depths of the events, wherein the visual representation of the wells provides a comprehensive view of the wells that includes visualizations of how different sections of the wells are positioned with respect to different formations and how events in different wells correspond to events in other wells; and the second graphical user interface includes lines that provide graphical representations of data series showing well depth progress in relation to days spent for multiple wells, wherein the second graphical user interface enables user selection of origin points from which the lines are generated, wherein the lines include a first line showing a first graphical representation of a first data series showing the well depth progress in relation to days spent for a first well, wherein responsive to user selection of a first point on the first line, a first origin point for the first line is set to the first point on the first line.

10. The method of claim 9, wherein the coupled unstructured information is coupled to the well based on user coupling of the coupled unstructured information to the well.

11. The method of claim 9, wherein:

the first information being directly coupled to the well includes the first information including information on a bit run connected to the well;

the second information being directly coupled to the first information includes the second information including images of a bit connected to the bit run; and the images of the bit are obtained as the coupled well information based on the images of the bit being indirectly coupled to the well via the bit run.

12. The method of claim 10, wherein the user coupling of the coupled unstructured information to the well is facilitated by a computer-aided search of unstructured information within one or more data sources.

13. The method of claim 12, wherein the computer-aided search of the unstructured information within the one or more data sources includes a search of one or more characters extracted from an unstructured file.

14. The method of claim 12, wherein the computer-aided search of the unstructured information within the one or more data sources includes a search of the unstructured information for a feature, a property, or a log of the well.

15. The method of claim 13, wherein the unstructured file includes a document file, a presentation file, a message file, an image file, a video file, or an audio file, further wherein the unstructured file is processed to determine whether the unstructured file includes textual content based on the unstructured file including the image file.

16. The method of claim 14, wherein:

an unstructured file including one or more text or one or more visual representations of the feature, the property or the log of the well is found responsive to the search of the unstructured information for the feature, the property or the log of the well; and portions of the unstructured file including the one or more text or the one or more visual representations of the feature, the property or the log of the well is presented to facilitate user coupling of the unstructured file to the well.

* * * * *